United States Patent
Pederson et al.

(10) Patent No.: US 6,820,411 B2
(45) Date of Patent: Nov. 23, 2004

(54) COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION

(75) Inventors: Robert J. Pederson, Thousand Oaks, CA (US); Stephen N. Schmotolocha, Thousand Oaks, CA (US); Donald H. Morris, Thousand Oaks, CA (US); Calvin Q. Morrison, Jr., Thousand Oaks, CA (US); Raymond B. Edelman, Woodland Hills, CA (US)

(73) Assignee: The Boeing Company, Chicago, IL (US)

(*) Notice: Subject to any disclaimer, the term of this patent is extended or adjusted under 35 U.S.C. 154(b) by 46 days.

(21) Appl. No.: 10/243,961

(22) Filed: Sep. 13, 2002

(65) Prior Publication Data

US 2004/0050056 A1 Mar. 18, 2004

(51) Int. Cl.$^7$ ............................. F02K 7/08; F02K 1/00
(52) U.S. Cl. ............................. 60/229; 60/737; 60/748; 60/750; 60/751; 239/265.27; 244/169
(58) Field of Search .......................... 60/767, 768, 228, 60/229, 737, 748, 746, 747, 750, 751; 239/265.25, 265.27; 244/169

(56) References Cited

U.S. PATENT DOCUMENTS

| | | | | |
|---|---|---|---|---|
| 2,605,611 A | * | 8/1952 | Wosika | 60/799 |
| 2,720,754 A | * | 10/1955 | Francois | 60/767 |
| 2,773,350 A | * | 12/1956 | Barrett et al. | 60/263 |
| 2,833,115 A | * | 5/1958 | Clarke et al. | 60/751 |
| 3,576,384 A | * | 4/1971 | Peczeli et al. | 431/353 |
| 3,977,353 A | | 8/1976 | Toyama | |
| 4,263,780 A | * | 4/1981 | Stettler | 60/737 |
| 4,343,147 A | * | 8/1982 | Shekleton | 60/749 |
| 4,461,146 A | | 7/1984 | DuBell | |
| 4,470,262 A | * | 9/1984 | Shekleton | 60/737 |
| 4,598,553 A | | 7/1986 | Saito et al. | |
| 4,648,571 A | | 3/1987 | Gerhardt | |
| 4,686,826 A | | 8/1987 | Koshoffer et al. | |
| 5,101,633 A | * | 4/1992 | Keller et al. | 60/737 |
| 5,240,404 A | | 8/1993 | Hemsath et al. | |
| 5,251,447 A | * | 10/1993 | Joshi et al. | 60/737 |
| 5,319,935 A | * | 6/1994 | Toon et al. | 60/737 |
| 5,411,394 A | * | 5/1995 | Beer et al. | 431/9 |
| 5,511,970 A | * | 4/1996 | Irwin et al. | 431/9 |
| 5,675,971 A | * | 10/1997 | Angel et al. | 60/746 |
| 5,685,142 A | | 11/1997 | Brewer et al. | |
| 5,779,169 A | * | 7/1998 | Sloan | 244/12.3 |
| 6,301,900 B1 | | 10/2001 | Mandai et al. | |
| 6,374,615 B1 | * | 4/2002 | Zupanc et al. | 60/748 |

* cited by examiner

*Primary Examiner*—Ted Kim
(74) *Attorney, Agent, or Firm*—Harness Dickey & Pierce P.L.C.

(57) ABSTRACT

An apparatus for providing propulsive power that utilizes a novel swirl generator for rapidly and efficiently atomizing, vaporizing, as necessary, and mixing a fuel into an oxidant. The swirl generator converts an oxidant flow into a turbulent, three-dimensional flowfield into which the fuel is introduced. The swirl generator effects a toroidal outer recirculation zone and a central recirculation zone, which is positioned within the outer recirculation zone. These recirculation zones are configured in a backward-flowing manner that carries heat and combustion byproducts upstream where they are employed to continuously ignite a combustible fuel/oxidizer mixture in adjacent shear layers. The swirl generator is compatible with the throttle range of conventional gas turbine engines, provides smooth combustion with no instabilities and minimum total pressure losses, enables significant reductions the in L/D ratio of the combustor and is readily packaged into various applications. Other benefits include simplicity, reliability, wide flammability limits and high combustion efficiency/thrust performance. This concept is applicable to various propulsion systems such as such as ramjet missiles, combine cycle engines, gas turbine afterburners and energy conversion devices.

97 Claims, 21 Drawing Sheets

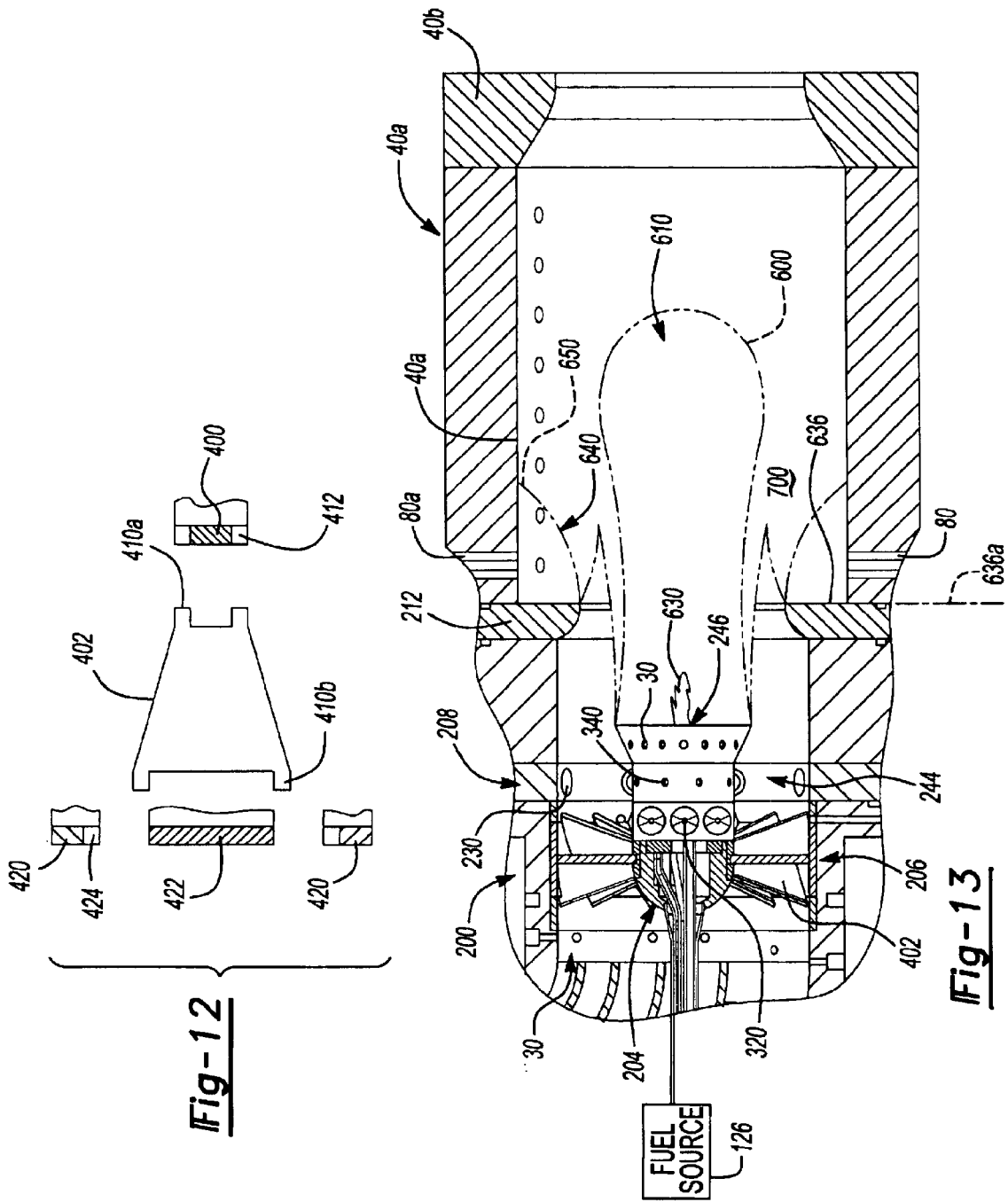

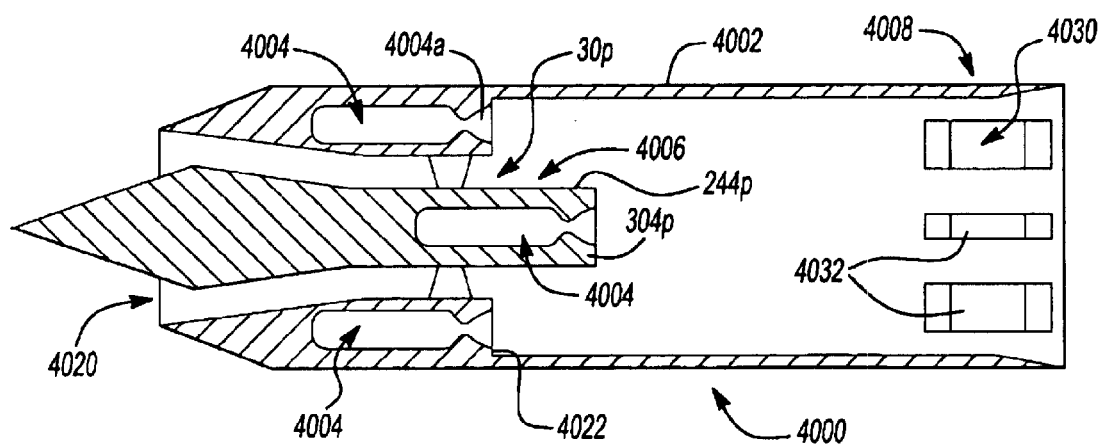
_Fig-36_
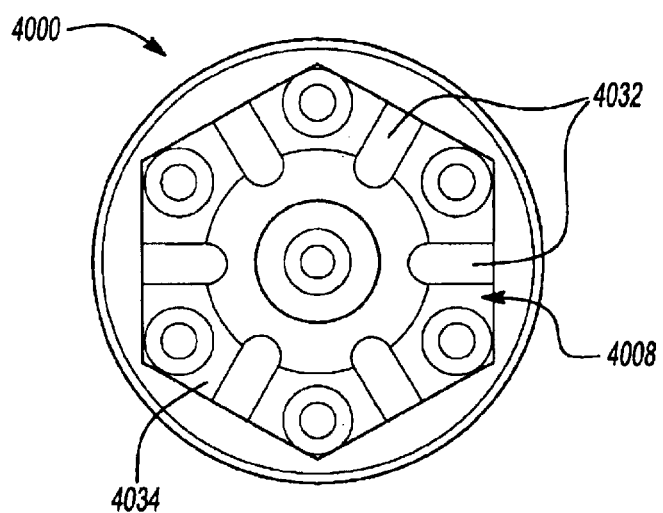
_Fig-37_

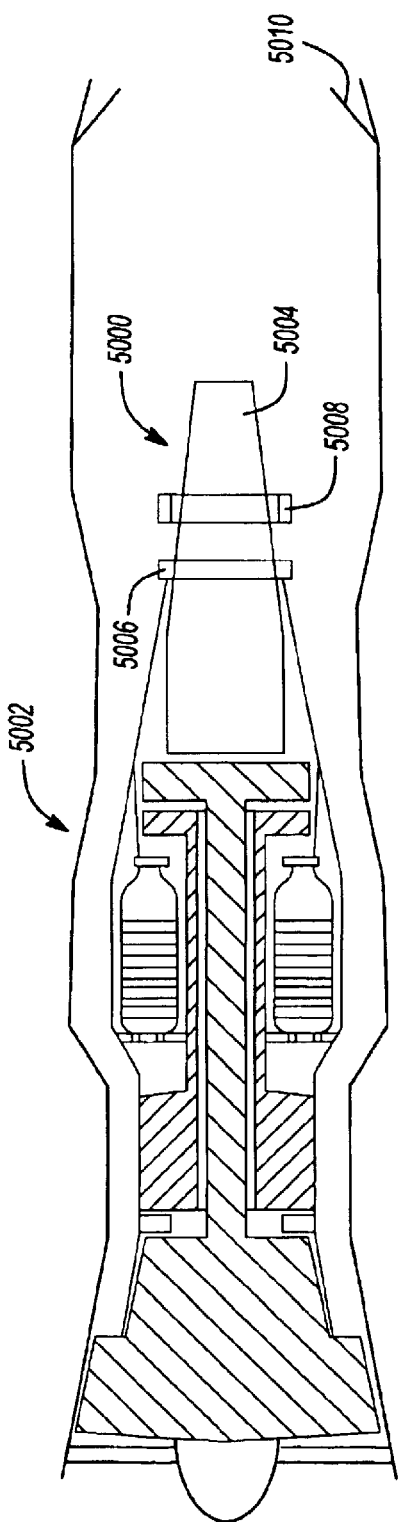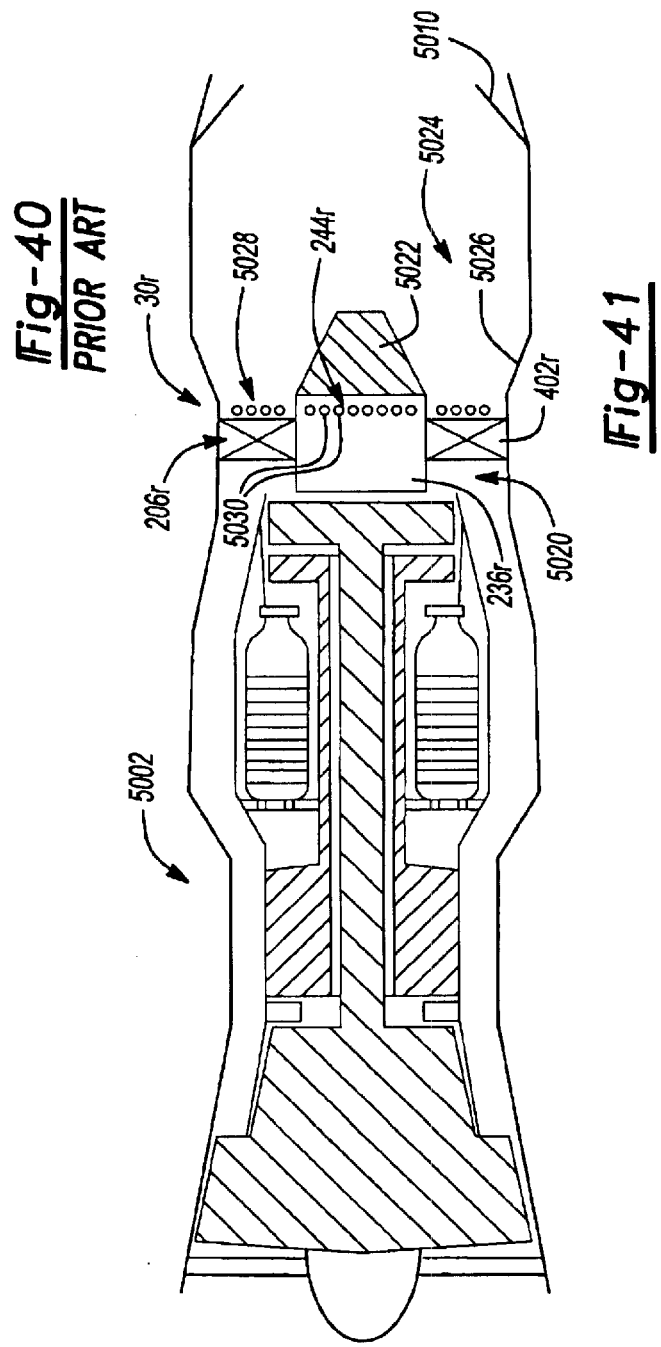
Fig-40 PRIOR ART
Fig-41

COMPACT, LIGHTWEIGHT HIGH-PERFORMANCE LIFT THRUSTER INCORPORATING SWIRL-AUGMENTED OXIDIZER/FUEL INJECTION, MIXING AND COMBUSTION

FIELD OF THE INVENTION

The present invention generally relates to improvements in combustors and more particularly to an improved fuel/oxidizer mixing and combusting apparatus that is readily integrated into a compact, lightweight, high-performance lift thrust producing and energy conversion devices.

BACKGROUND OF THE INVENTION

During the development of the Boeing Joint Strike Fighter (JSF) Short Take-Off Vertical Landing (STOVL) aircraft propulsion system, we found it desirable to incorporate a means for providing auxiliary thrust capability to augment the core engine lift thrust. We evaluated numerous propulsion options that were based on conventional combustor technology, but drawbacks associated with each of these options precluded their employment in the STOVL aircraft propulsion system.

These drawbacks were primarily related to the overall length of the combustor, rendering the incorporation of various known propulsion options into the STOVL aircraft propulsion system unpractical due to concerns for weight and packaging. In this regard, it is relatively common for combustors without high total pressure loss instream flameholders to be designed with a length-to-diameter (L/D) ratio of 5 or more, wherein the length of the combustor is defined as being the distance between the combustor dump plane and the nozzle throat. Reductions in the L/D ratio of suitable known combustors was not possible, as a shortening of the combustor's length would not provide sufficient time for the fuel and air (oxidizer) to mix and combust prior to their discharge through the nozzle.

SUMMARY OF THE INVENTION

In one preferred form, the present invention provides a fuel/oxidizer mixing and combusting apparatus having a combustor and a swirl generator. The swirl generator includes an inlet housing, a swirl vane pack, a centerbody assembly and a plurality of fuel injectors. The inlet housing is coupled to the combustor inlet and defines a hollow interior volume that intersects the combustor inlet at a dump step. An oxidizer flow having a velocity that is substantially defined by an axial velocity component is conducted through the hollow interior volume. The swirl vane pack is disposed within the hollow interior volume and includes a plurality of vanes that cooperate to change the velocity of the oxidizer flow so that it includes a substantial tangential velocity component. The centerbody assembly is disposed in the hollow interior volume and coupled to the swirl vane pack such that it extends rearwardly from the swirl vane pack. The fuel injectors are coupled to at least one of inlet housing, the swirl vane pack and the centerbody and dispense fuel therefrom. The swirl generator converts the oxidizer flow received therein into a swirling, three-dimensional flowfield, a first portion of which flows over the dump step to form an outer recirculation zone and a second portion of the flowfield forms a central recirculation zone that is anchored by an aft end of the centerbody assembly. A first portion of the fuel mixes with the first portion of the flowfield to fuel the outer recirculation zone and a second portion of the fuel mixes with the second portion of the flowfield to fuel the central recirculation zone.

In another preferred form, the present invention provides an apparatus comprising a combustor and a swirl generator, the swirl generator is coupled to the inlet of the combustor and is operable for converting an oxidizer flow with a velocity that is substantially completely defined by an axial velocity component into a three-dimensional flowfield that includes a substantial tangential velocity component. The swirl generator includes a flow defining means and a fueling means. The flow defining means is operable for controlling both a toroidal outer recirculation zone and a central recirculation zone that is disposed inwardly of the outer recirculation zone in the combustor. The fueling means is operable for fueling the outer and central recirculation zones. Heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones.

The present invention overcomes the aforementioned drawbacks by providing a fuel/oxidizer mixing and combusting apparatus that permits extremely rapid fuel atomization, vaporization and mixing with a combustion efficiency that is ranges from about 90% to about 99%. Consequently, we were able to reduce the length of the combustor to attain L/D ratios substantially less than that which was attained by the known combustors.

In yet another preferred form, the present invention provides an apparatus for providing propulsive power having an inlet structure, a swirl generator and a combustor. The inlet structure is configured to conduct an oxidizer flow therethrough and includes a plurality of flow guiding vanes that cooperate to affect the oxidizer flow such that it is substantially uniform and axial. The swirl generator is coupled to an aft end of the inlet structure and includes a flow affecting means and a fueling means. The flow affecting means includes a plurality of vanes, a dump step and a centerbody with an aft end that terminates rearwardly of a root of the vanes. The flow affecting means is operable for converting the axialsymmetric oxidizer flow into a three dimensional flowfield that includes a substantial tangential velocity component. The flow affecting means is also operable for forming and controlling both a toroidal outer recirculation zone, which is anchored by the dump step, and a central recirculation zone, which is disposed inwardly of the outer recirculation zone and anchored by the aft end of the centerbody. The fueling means is operable for fueling the outer and central recirculation zones and a core flow. The combustor coupled to an aft end of the swirl generator and includes a nozzle. Heat and combustion by-products produced during combustion are carried upstream by the outer and central recirculation zones where they are employed to continuously ignite a combustible fuel/oxidizer mixture in a shear layer adjacent each of the outer and central recirculation zones. Combustion by-products from the core flow are expelled through the nozzle to produce thrust.

The present invention overcomes the aforementioned drawbacks by providing an apparatus for providing propulsive power that utilizes swirl combustion in a manner that significantly reduces the overall weight and size of the apparatus relative to other propulsion devices that employ conventional combustor technology. The apparatus of the present invention is compatible with the throttle range of a conventional gas turbine engine, provides smooth combustion with no instabilities with minimum total pressure losses, enables significant reductions in the L/D ratio of the combustor relative to the known combustors and is readily packaged into various applications. Other benefits over the known art include simplicity, reliability, wide flammability limits and high combustion efficiency and high thrust performance. Furthermore, the apparatus of the present invention provides substantial flexibility to retune existing combustor designs to meet specific combustor requirements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

FIG. 12 is an exploded sectional view of a portion of the swirl vane pack;

FIG. 13 is a longitudinal section view similar to that of FIG. 4 but illustrating a combustion event;

FIG. 36 is a longitudinal section view of a rocket-based combined cycle engine constructed in accordance with the teachings of the present invention;

FIG. 37 is a rear elevation view of the rocket-based combined cycle engine of FIG. 37;

FIG. 40 is a longitudinal section view of an aircraft engine having a conventional afterburner; and FIG. 41 is a longitudinal section view similar to FIG. 40 but illustrating an afterburner that incorporates a swirl generator constructed in accordance with the teachings of the present invention.

DETAILED DESCRIPTION OF THE PREFERRED EMBODIMENTS

Figure 1:
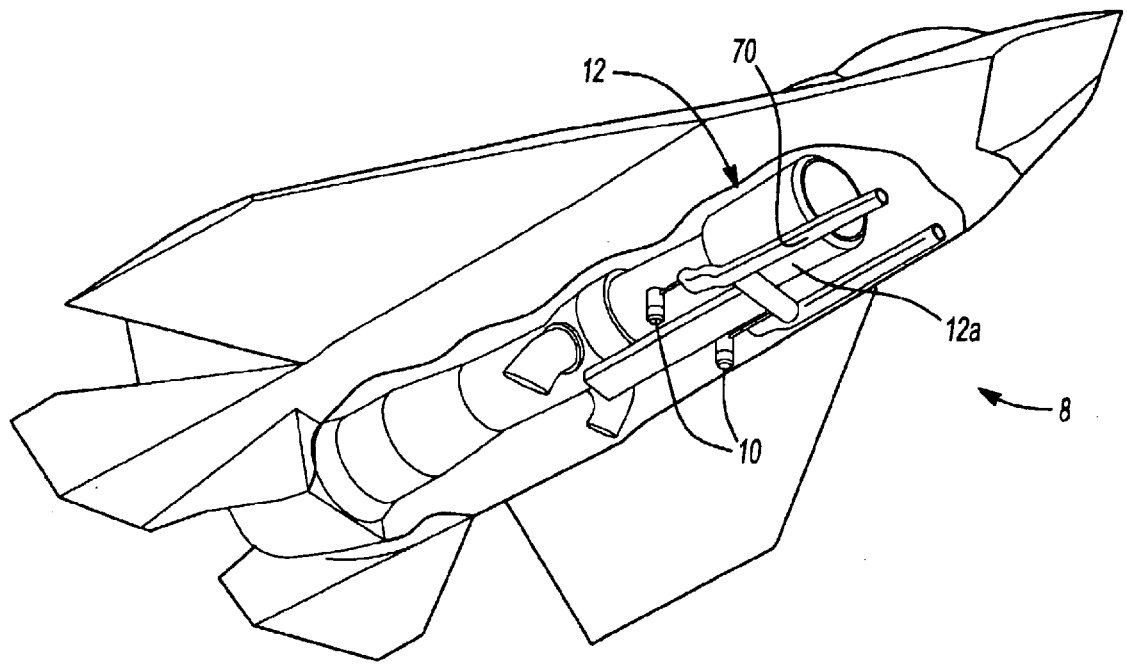
FIG. 1 is a perspective view of a jet aircraft having a pair of lift thrust augmentors constructed in accordance with the teachings of the present invention.

With reference to FIG. 1 of the drawings, an exemplary jet aircraft 8 is illustrated to include a pair of lift thrust augmentors 10 that are constructed in accordance with the teachings of the present invention. A conventional gas turbine engine 12 serves as the primary source of propulsive power for the jet aircraft 8, while the lift thrust augmentors 10 are selectively operable to produce thrust when the demand for thrust exceeds a predetermined threshold.

Figure 2:
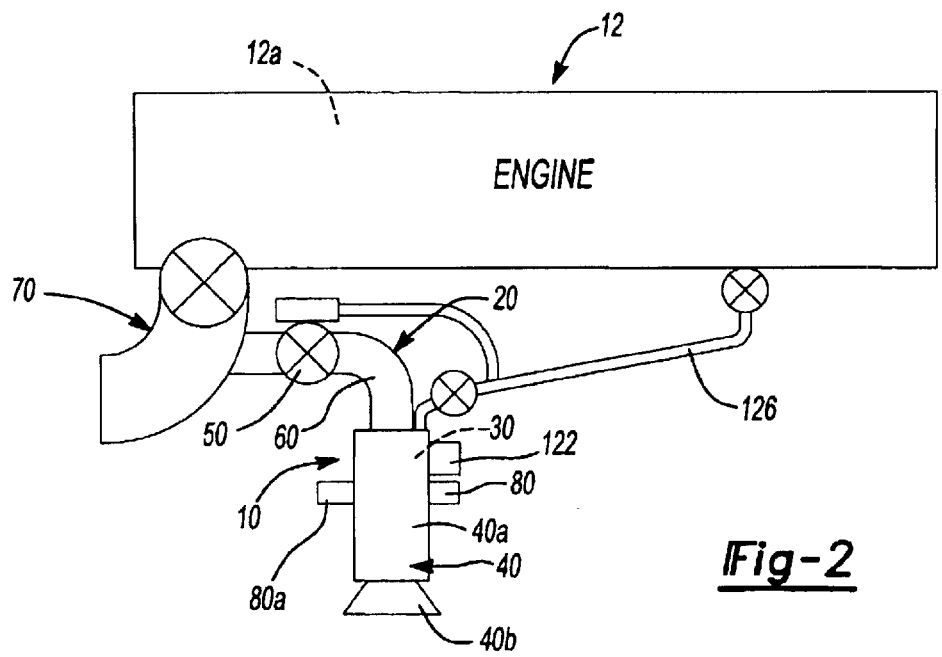
FIG. 2 is a schematic illustration of a portion of the jet aircraft of FIG. 1.
Figure 3:
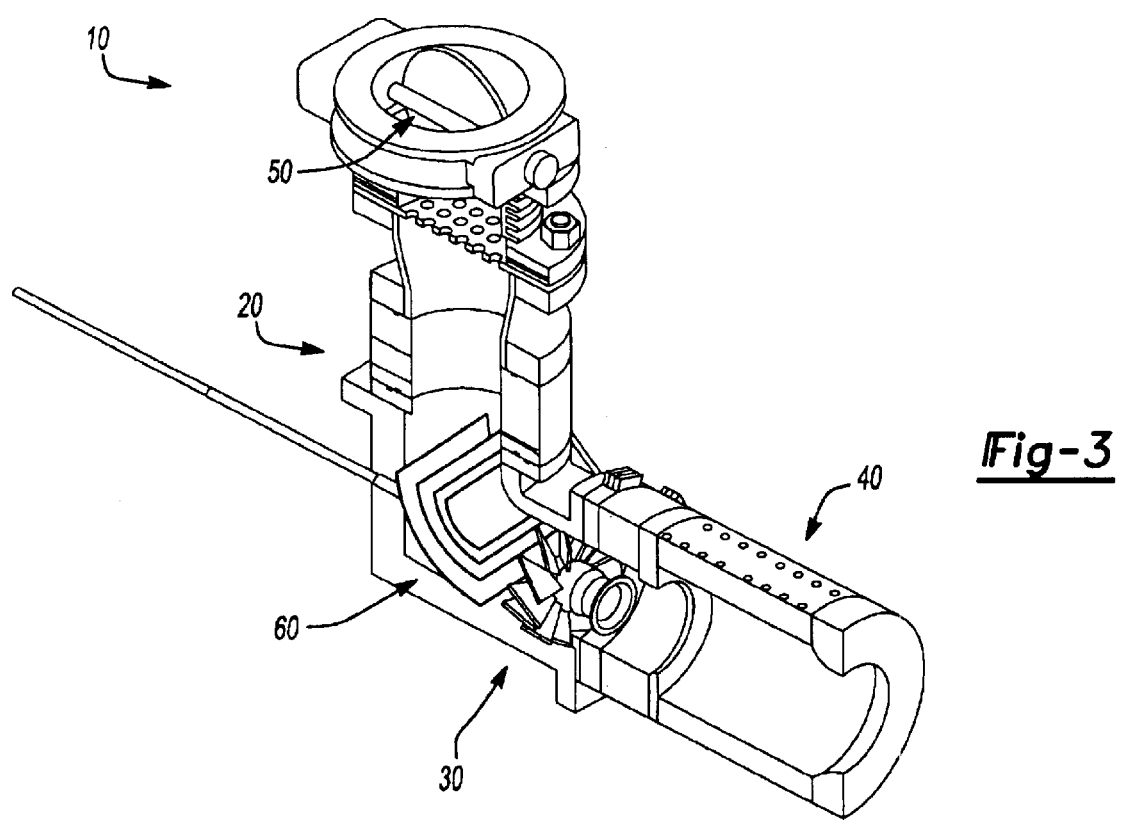
FIG. 3 is a cut-away perspective view of a portion of the lift thrust augmentor illustrated in FIG. 1.
Figure 4:
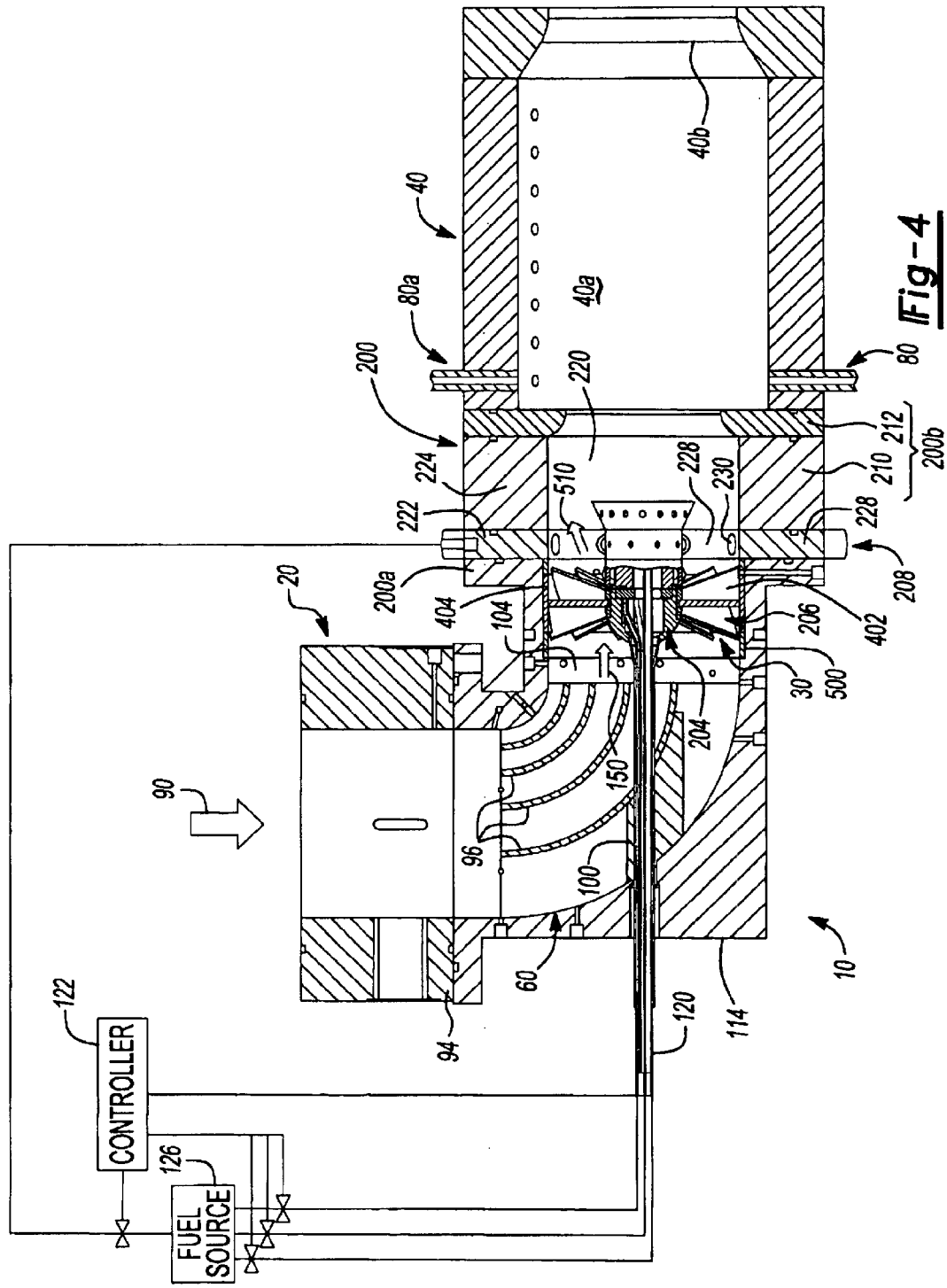
FIG. 4 is a longitudinal section view of a portion of the lift thrust augmentor.

With additional reference to FIGS. 2 through 4, each lift thrust augmentor 10 includes an air delivery portion 20, a swirl generator 30 and a combustor/nozzle portion 40. When combined, the swirl generator 30 and combustor/nozzle portion 40 are also known as a compact swirl-augmented thruster (COSAT). The air delivery portion 20 includes a butterfly valve 50 and in the particular example provided, an elbow 60. It will be readily apparent to those skilled in the art that the air delivery portion 20 may be configured in any manner to package the lift thrust augmentor 10 into a particular application and as such, the elbow 60 may be omitted or the bend angle changed to suit the specific needs of a given application.

The butterfly valve 50 and the elbow 60 are coupled in fluid connection to the gas turbine engine 12. More specifically, hot high-pressure air is bled from the bypass fan 12a of the gas turbine engine 12 and diverted through a lateral jetscreen feed system (not specifically shown) to an attitude control system 70. The butterfly valve 50, which is normally maintained in a closed condition and coupled in fluid connection with the attitude control system 70, is opened to divert a predetermined amount (i.e., mass flow rate) of the hot high-pressure bleed air to the lift thrust augmentors 10. In the particular embodiment provided, about 30% of the airflow that is directed into the attitude control system 70 is redirected to the lift thrust augmentors 10 when the lift thrust augmentors 10 are operated to provide maximum thrust.

The air that passes by the butterfly valve 50 is routed through the elbow 60 to the swirl generator 30. As will be described in greater detail below, the swirl generator 30 injects fuel in to the air and promotes the efficient mixing of the air and fuel. A torch igniter 80, such as that described in copending U.S. patent application Ser. No. 10/217,972 entitled "Torch Igniter", the disclosure of which is hereby incorporated by reference as if fully set forth herein, is employed to initiate a combustion event wherein the fuel/air mixture is burned in the combustor 40a of the combustor/nozzle portion 40. Those skilled in the art will appreciate that igniters, including electric spark igniters, plasma jet igniters, lasers and microwaves, may be employed in the alternative. As the construction of the combustor 40a is well known in the art, a detailed discussion of the combustor will not be provided herein. For example, those skilled in the art will appreciate that the combustor 40a may be wholly formed of a suitable high temperature material, or may utilize a perforated liner that facilitates air-cooling of the combustor 40a, or may utilize a wall that is partially or wholly comprised of fluid conduits that facilitate a flow of fluid through or about the combustor wall that operates to cool the combustor 40a during its operation.

Thereafter, hot combustion by-products are expelled through a nozzle 40b, such as a convergent nozzle (FIG. 4) or a convergent/divergent nozzle (FIG. 2), to produce thrust. It will be understood that the particular combustible mixture (i.e., a liquid fuel and air) that is utilized in this example is not intended to limit the scope of the disclosure in any way. In this regard, those skilled in the art will understand that any type of fuel (e.g., liquid, slurry, gas) and any type of oxidant (e.g., air, hydrogen peroxide, oxygen) may be utilized in the swirl generator and lift thrust augmentor of the present invention. Accordingly, when the term "mixing" is used in the context of a fuel/oxidant mixture, it will be understood to include atomization and vaporization if the fuel is not injected in gaseous state.

Figure 5:
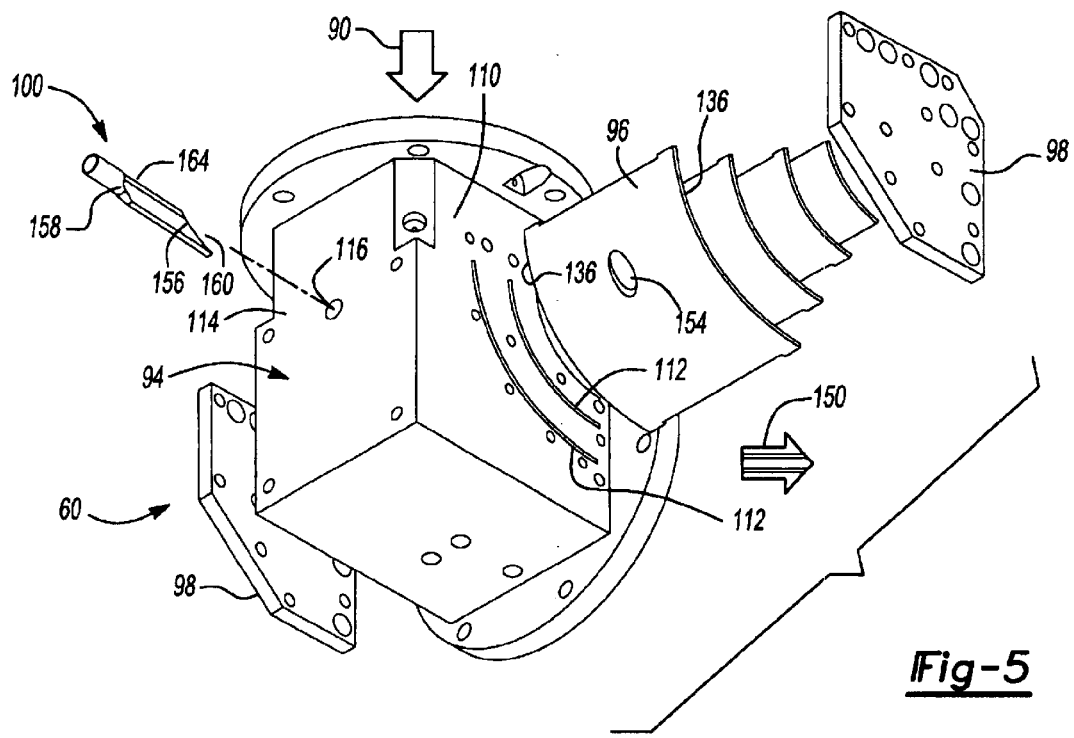
FIG. 5 is an exploded perspective view of a portion of the lift thrust augmentor illustrating the elbow in greater detail.
Figure 6:
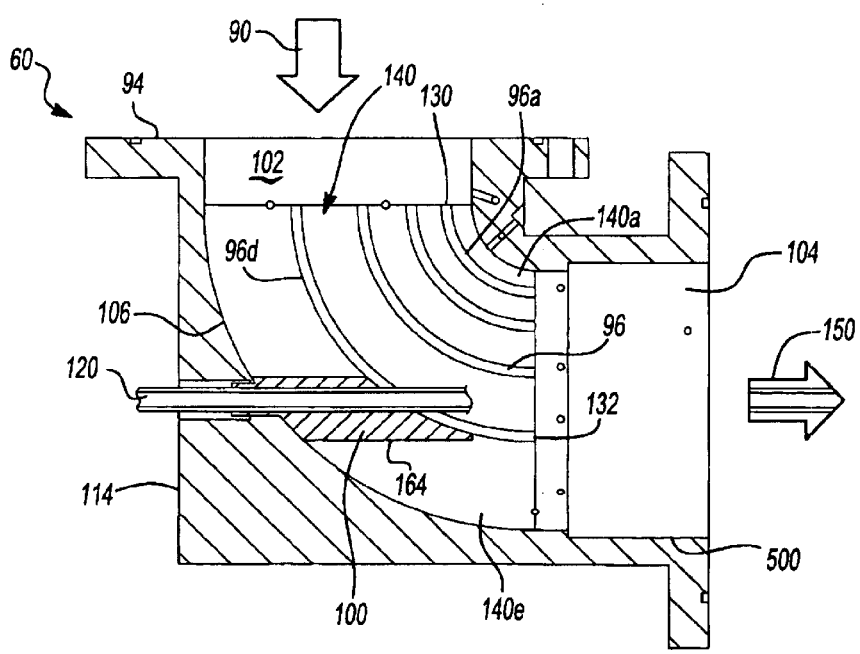
FIG. 6 is a longitudinal section view of the elbow.

With reference to FIGS. 5 and 6, the elbow 60 is illustrated to turn the airflow 90 about 90° and is relatively constant in its cross-sectional area. The elbow 60 includes an elbow housing 94, a plurality of flow guide vanes 96, a pair of side covers 98 and an aerodynamic fairing 100. As will be readily apparent to one skilled in the art, the components of the elbow 60 may be fabricated out of any appropriate material, the selection of which is largely dependant on the temperature of the air entering the air delivery portion 20 (FIG. 2). In the particular example provided, the inlet temperature may be relatively high and as such, materials including Cress stainless steel series (e.g., 304, 321), Haynes 240, ceramic matrix composites (e.g., C/SiC, SiC/SiC, $Si_3N_4$, $Al_2O_3/Al_2O_3$) would be appropriate for the construction of the components of the elbow 60. As those skilled in the art will appreciate, various thermally protective coatings (e.g., ceramics) and/or heat transfer techniques that rely on a cooling effect provided by a working fluid (e.g., fuel, air) may additionally or alternatively be employed to render the components of the elbow 60 suitable for a given set of inlet conditions.

The elbow housing 94 is shown to include an inlet portion 102 and an outlet portion 104 that are interconnected by an arcuate turning portion 106. The elbow housing 94 may be unitarily formed via conventional processes such as casting or machining (from bar stock), or may be a multi-component fabrication that is fixedly coupled together as by welding.

The lateral sidewalls 110 of the turning portion 106 include a plurality of concentric slots 112 that are formed therethrough, while the endwall 114 in the turning portion 106 includes a fairing aperture 116. The fairing aperture 116 is sized to receive a portion of the aerodynamic fairing 100, as well as a conduit 120 (FIG. 4) that couples the swirl generator 30 to an ignition controller 122 (FIG. 4) that actuates the lift thrust augmentor 10, as well as the fuel source 126 (FIG. 4) of the jet aircraft 8.

The flow guide vanes 96 are curved about a single axis and slide into the turning portion 106 through the concentric slots 112. Accordingly, the flow guide vanes 96 extend across the inner dimension of the turning portion 106 in a direction that is generally perpendicular to the direction of the air flow and concentric with the radius of the turn in the turning portion 106. The flow guide vanes 96 are also configured such that they extend between the inlet portion 102 and the outlet portion 104 of the elbow housing 94. Accordingly, the radially inward flow guide vanes, such as flow guide vane 96a, are relatively shorter than the radially outer flow guide vanes, such as flow guide vane 96d.

The leading and trailing edges 130 and 132, respectively, of the flow guide vanes 96 preferably engage the opposite ends of the concentric slots 112, while the opposite lateral sides 136 of the flow guide vanes 96 are abutted against the side covers 98, which are fixedly secured to the elbow housing 94 via a plurality of screws (not specifically shown). Additionally or alternatively, the flow guide vanes 96 may be welded in place to secure them in place within the concentric slots 112.

The flow guide vanes 96 are employed to mitigate air flow distortions and flow separation induced by the associated upstream butterfly valve 50 (FIG. 2) as well as to prevent further flow separation, the creation of secondary flows and large scale profile distortions due to centrifugal forces as the inlet flow undergoes the 90° turn through the turning portion 106. If unabated, secondary flows, separations and distortions tend to complicate the design and operation of the downstream fuel injection, reduce the mixing effectiveness and provide stimuli for combustion instabilities and inefficiencies. This would, in turn, tend to reduce the life cycle of the lift thrust augmentor 10 and create unacceptable thrust pulsations. Consequently, the configurations of the air delivery portion 20 (generally) and the elbow 60 (specifically) provide a high degree of uniformity in the flow of air (i.e., a uniform axial airflow) to the swirl generator 30.

As best seen in FIG. 6, the flow guide vanes 96 cooperate with the elbow housing 94 to define a plurality of inlet flow channels 140. As the path that is defined by inlet flow channel 140a is relatively shorter between the inlet portion 102 and the outlet portion 104 as compared with the inlet flow channel 140e and as transient flow differences between the inlet flow channels 140 are highly undesirable, the flow guide vanes 96 of the particular embodiment illustrated are positioned in a radial direction in a manner that provides inlet flow channels 140 with dissimilar cross-sectional areas such that the inlet flow channels 140 produce a series of inlet flows that are relatively uniform in flow velocity. Accordingly, the inlet flow 150 to the swirl generator 30 has a velocity that is substantially completely defined by an axial velocity component.

In FIGS. 4 through 6, the conduit 120 that couples the swirl generator 30 to the ignition controller 122 (FIG. 2) and the fuel source 126 (FIG. 2) is illustrated to extend through the endwall 114 of the turning portion 106, through a conduit aperture 154 in the flow guide vane 96d and out the outlet portion 104 of the elbow housing 94 where it is coupled to the swirl generator 30. The presence of the conduit 120 in the interior of the turning portion 106 would ordinarily initiate a flow separation, which as mentioned above, reduces the effectiveness and efficiency of the lift thrust augmentor 10. The aerodynamic fairing 100, however, is employed to reduce or eliminate altogether, the flow separations that would be induced by the presence of the conduit 120.

In the example provided, the aerodynamic fairing 100 includes a hollow hub 156 and an airfoil portion 158 that is coupled to the hub 156. The conduit 120 extends through the hollow interior of the hub 156 and may be coupled thereto by any appropriate retaining means, including an interference fit (e.g., shrink fit or press fit), brazing and welding. The airfoil portion 158, which surrounds the conduit 120, extends in the in the down-wind direction in a tapered manner and terminates at its trailing edge 164 with a relatively small amount of trailing edge bluntness. Alternatively, the airfoil portion 158 may be configured to abut the windward side of the conduit 120. The airfoil portion 158 is positioned within the flow channel 140e so as to reduce or eliminate altogether the flow separations that would be induced by the presence of the conduit 120. The hub 156 and/or airfoil portion 158 may be fixedly coupled to the elbow housing 94 by any appropriate retaining means, including an interference fit (e.g., shrink fit or press fit), brazing and welding.

Figure 7:
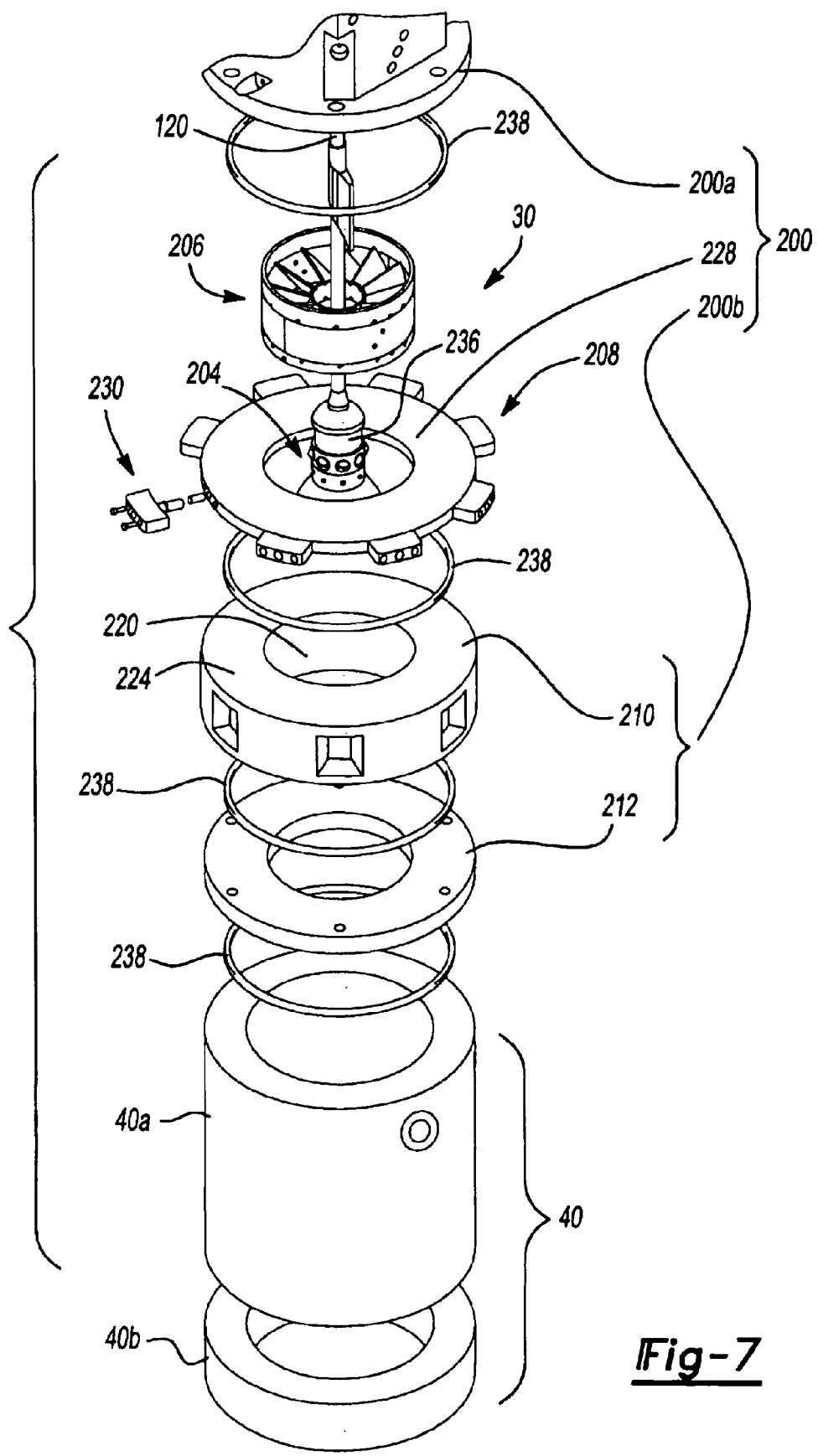
FIG. 7 is an exploded perspective view of a portion of the lift thrust augmentor.

With reference to FIGS. 4 and 7, the swirl generator 30 is illustrated to include an inlet housing 200, a centerbody hub assembly 204, a swirl vane pack 206 and a wall injector assembly 208. In the particular example provided, the inlet housing 200 is illustrated to include an upper inlet housing segment 200a, which is coupled to and integrally formed with the outlet portion 104 of the elbow 60, an optional wall injection housing 228 (which will be described in detail, below) and an optional lower inlet housing segment 200b, which is coupled to the combustor/nozzle portion 40 and which includes an inlet extension 210 and an inlet ramp 212. Alternatively, the inlet housing 200 may be unitarily formed. Also alternatively, the upper inlet housing segment 200a may be separate from the outlet portion 104 of the elbow 60 and/or the lower inlet housing segment 200b, if included, may be integrally formed with the combustor/nozzle portion 40. Accordingly, those skilled in the art will appreciate that one or more of the upper and lower inlet housing segments 200a and 200b and the wall injection housing 208 may not exist as a discrete component. In the presently preferred configuration of the lift thrust augmentor 10, the upper inlet housing segment 200a is integrally formed with the elbow 60 so as to minimize the overall length of the lift thrust augmentor 10.

The inlet housing 200 defines a hollow interior volume 220 into which the centerbody hub assembly 204 extends. The injection of fuel into the lift thrust augmentor 10 is illustrated to include fuel injection through the wall 224 of the inlet housing 200 at a location forwardly of the inlet ramp 212. The sizing and purpose of the inlet ramp 212 will be discussed in greater detail, below.

As all fuel injection occurs downstream of the swirl vane pack 206, the presence of the inlet extension 210 effectively shifts the various points of fuel injection in an upstream direction relative to the inlet ramp 212 so as to provide additional time for the fuel to mix (i.e., for the liquid fuel of this example to atomize, mix and vaporize) prior to entering the combustor 40a. Those skilled in the art will appreciate that the amount of additional mixing time that is afforded by the inlet extension 210 is a function of its length. Those skilled in the art will also appreciate that the need for an inlet extension is based on the state of the air flow, such as the velocity, temperature, pressure and the characteristics of the fuel that is being used. Therefore, in some of the applications that we have conceived for the swirl generator 30, such as ramjets, the air flow is at a sufficiently high temperature such that even liquid fuels are rapidly mixed (i.e., atomized, mixed and vaporized), which permits the aft end of the centerbody hub assembly 204 to be positioned so as to extend downstream of the inlet ramp 212 into the combustor 40a.

In the particular example provided, wall injection is accomplished through the wall injector assembly 208. The wall injector assembly 208 includes an annular wall injection housing 228 (which is considered to be part of the injection housing 200) and a plurality of fuel injectors 230 that are circumferentially spaced about the wall injection housing 228. The inside diameter of the wall injection housing 228 is equal in diameter to the inner diameter of the lower inlet housing segment 200b so as to be flush and not to induce flow separations, etc. that would tend to impede the efficiency of the swirl generator 30. The inside diameter wall injection housing 228, however, is somewhat smaller in diameter than the inside diameter of the upper inlet housing segment 200a for reasons that will be described in detail, below.

The wall injection housing 228 is disposed between the aft end of the upper inlet housing segment 200a and the forward end of the lower inlet housing segment 200b. Conventional Viton O-rings 238 or other sealing devices that are well known in the art are employed to seal the interface between the opposite faces of the wall injection housing 228 and the upper and lower inlet housing segments 200a and 200b. Threaded fasteners (not shown) are employed to fixedly couple the elbow 60, the upper inlet housing segment 200a, the wall injection housing 228, the lower inlet housing segment 200b and the combustor/nozzle portion 40 together.

In the example shown, the fuel injectors 230 comprise eight flush-mount simplex fuel injectors such as Woodward FST Simplex Injectors, which are commercially available from Woodward FST, Inc. of Zeeland, Mich. Those skilled in the art will appreciate, however, that other amounts and/or types of fuel injectors, including stand-off or wall flush simplex fuel injectors, orifice injectors or variable area poppet fuel injectors with variations in drop sizes and cone angles (i.e., solid or hollow cone) may also be used.

Figure 8:
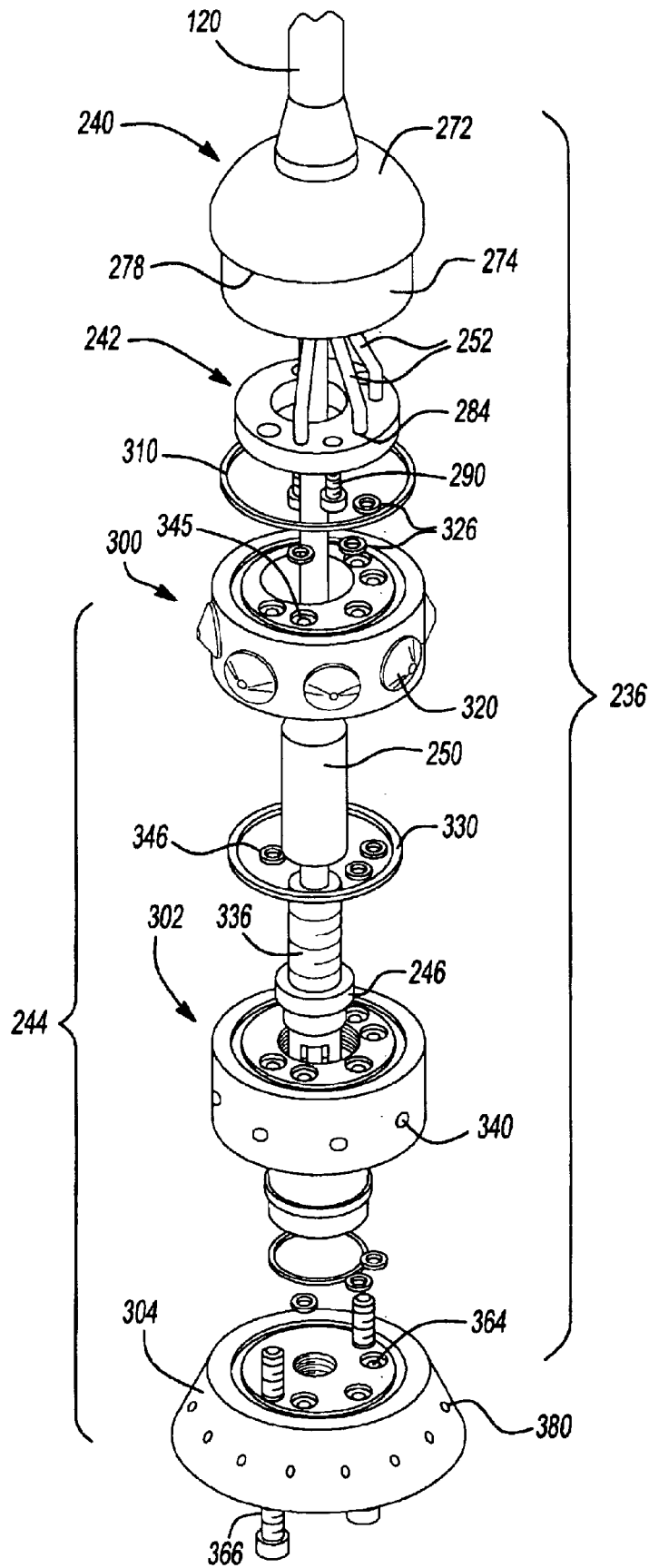
FIG. 8 is an exploded perspective view of a portion of the lift thrust augmentor illustrating the centerbody hub assembly in greater detail.
Figure 9:
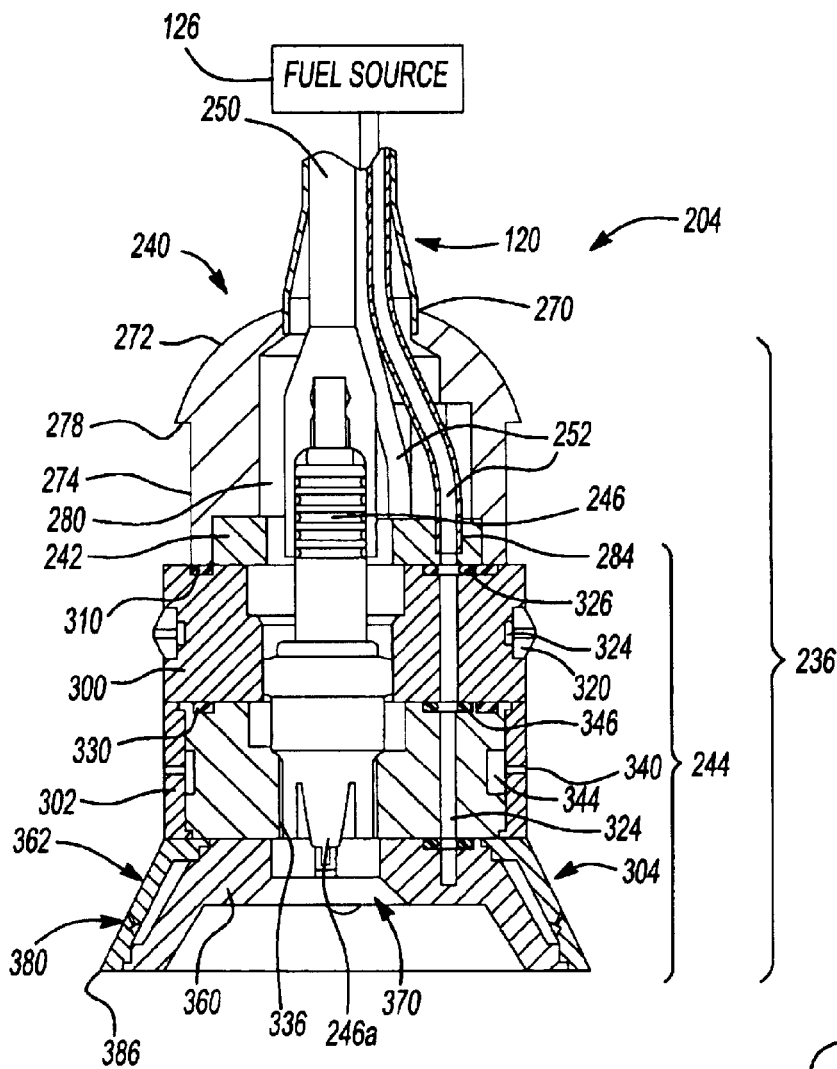
FIG. 9 is a longitudinal section view of the centerbody hub assembly.

In FIGS. 7 through 9, the centerbody hub assembly 204 is illustrated to include the conduit 120 and a centerbody assembly 236, which includes a forward centerbody 240, a conduit retainer 242, and an aft centerbody 244 and an igniter 246. In the particular embodiment illustrated, the igniter 246 is a conventional spark igniter which is commercially available from sources such as those that are manufactured by Champion Spark Plug Company of Toledo, Ohio. Accordingly, a detailed description of the construction of the igniter 246 will not be provided herein. Those skilled in the art will appreciate that other types of igniters, such as a plasma jet igniter (also well known in the art and commercially available from sources such as Unison Industries Inc. of Jacksonville Fla.), microwave ignition devices, and laser ignition devices may be employed as an alternative to a spark igniter.

As noted above, the conduit 120 extends through the elbow 60 (FIG. 4) to couple the swirl generator 30 (FIG. 4) to the ignition controller 122 (FIG. 4) and the fuel source 126 (FIG. 4). In the particular embodiment provided, the conduit 120 is a hollow tube into which an electrical cable 250 and a plurality of fuel conduits 252 are housed. The electrical cable 250 electrically couples the ignition controller 122 to the igniter 246 such that electrical energy is transmitted to the igniter 246 when the ignition controller 122 is actuated to permit the igniter 246 to produce a discharge arc (not shown). The fuel conduits 252 couple in fluid connection of the fuel source 126 to a plurality of fuel injectors in the aft centerbody 244. Those skilled in the art will appreciate, however, that a single fuel conduit (not shown) may be alternatively employed, wherein the single fuel conduit supplies fuel to a fuel manifold within or coupled to the aft centerbody 244 to which are coupled the fuel injectors. Also alternatively, the swirl generator 30 may be constructed without a discrete fuel conduit 252 wherein such function would additionally be provided by the conduit 120 that houses the electrical cable 250. Those skilled in the art will appreciate that these fuel splits could alternatively be accomplished through a set of orifices that effectively limit the mass flow rate of fuel therethrough.

The forward centerbody 240 is a generally hollow structure having a central aperture 270 into which the conduit 120 is fixedly coupled, as through brazing for example. The exterior surface of the forward centerbody 240 includes an aerodynamically contoured leading surface 272 as well as a mounting flange 274 to which the swirl vane pack 206 is mounted. The aerodynamically contoured leading surface 272, which is illustrated to be generally spherically shaped in the particular example provided, serves to guide the inlet flow 150 (FIG. 4) exiting the elbow 60 radially outwardly around the forward centerbody 240 and into the swirl vane pack 206. The mounting flange 274 has a diameter that is generally smaller than the trailing edge of the aerodynamically contoured leading surface 272 to thereby create an abutting flange 278 at the intersection of the mounting flange 274 and the leading surface 272. The aft end of the interior of the forward centerbody 240 includes a counterbored portion 280 that is configured to receive the conduit retainer 242.

The conduit retainer 242 is an annular structure with an open center that is configured to receive therethrough portions of the igniter 246 and the electrical cable 250. A plurality of conduit mounting apertures 284 are formed through the conduit retainer 242 and are sized to matingly receive an associated one of the fuel conduits 252. The fuel conduits 252 are preferably fixedly coupled to the conduit retainer 242 in their associated conduit mounting apertures 284 through an appropriate joining process, such as brazing. Conventional threaded fasteners, such as socket head cap screws 290, are preferably employed to fixedly but releasably couple the conduit retainer 242 to the forward centerbody 240.

The aft centerbody 244 may be configured in several different manners to optimize the efficiency of the lift thrust augmentor 10 and tailor its thrust output to a desired thrust output level. In the particular example provided the aft centerbody 244 includes first and second injector rings 300 and 302, respectfully, and an aft bluff boat-tail 304.

A conventional Viton O-ring 310 or other well known sealing device is employed to create a seal between the first injector ring 300 and the aft face of the forward centerbody 240. The first injector ring 300 has a generally hollow center through which the igniter 246 is received, and an outside diameter that is relatively larger in diameter than that of the mounting flange 274. The first injector ring 300 is illustrated to include a plurality of circumferentially spaced apart fuel injectors 320, such as simplex injectors having a flow number (FN) equal to about 8.5, which are commercially available from Woodward FST, Inc. of Zeeland, Mich. Those skilled in the art, however, will appreciate that other types of fuel injectors, including a plurality of orifices, could be additionally or alternatively employed. Although the injectors 320 are illustrated as being configured to inject fuel in a radially outward direction, those skilled in the art will appreciate that the fuel injectors 320 may be alternatively configured to inject fuel in an upstream direction, a downstream direction or any combination of the radially outward, downstream and upstream directions.

The fuel injectors 320 are coupled in fluid connection to a manifold 324 that is formed into the first injector ring 300. In the example provided, the manifold 324 is coupled in fluid connection to an associated one of the fuel conduits 252 to receive fuel therefrom. Those skilled in the art will appreciate, however, that the manifold 324 could also be coupled in fluid connection to each of the fuel conduits 252. A Viton O-ring 326 or other well known sealing device is employed to seal the interface between the conduit retainer 242 and the front face of the first injector ring 300.

Figure 9A:
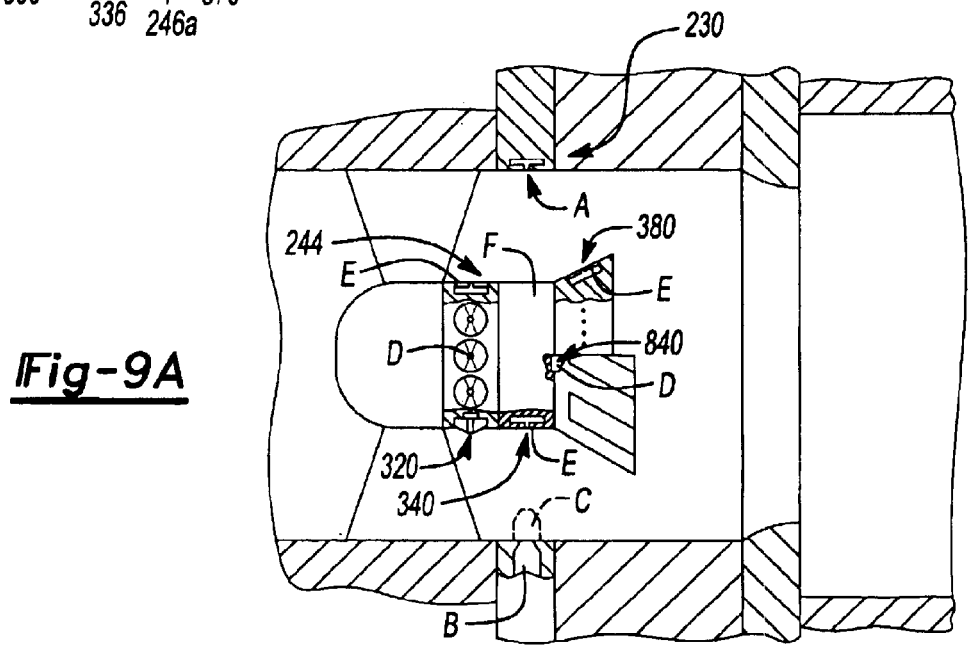
FIG. 9A is a schematic view of the swirl generator of the present invention illustrating several various centerbody assembly and wall injector fueling schemes.

A conventional Viton O-ring 330 or other well known sealing device is employed to create a seal between the second injector ring 302 and the aft face of the first injector ring 300. The second injector ring 302 has a generally hollow center that is at least partially threaded so as to threadably engage a threaded portion 336 of the igniter 246 in a conventional manner. The second injector ring 302 may include no fuel injectors (i.e., constitute a "blank" injector ring as shown in FIG. 9A), or may include a plurality of circumferentially spaced fuel injectors 340, such as simplex or orifice injectors, depending on the desired output of the lift thrust augmentor 10. Although the injectors 340 are illustrated as being configured to inject fuel in a radially outward direction (FIG. 8), those skilled in the art will appreciate that the fuel injectors 340 may be alternatively configured to inject fuel in an upstream direction, a downstream direction or any combination of the radially outward, downstream and upstream directions.

The second injector ring 302 may be keyed or otherwise aligned to the first injector ring 300 in any conventional manner to maintain the first and second injector rings 300 and 302 in a condition wherein they are aligned about a common axis. In this condition, the outer surface of the second injector ring 302 substantially coincides with the outer surface of the first injector ring 300 to thereby prevent the generation of any flow separations or discontinuities.

In the embodiments wherein the second injector ring 302 includes fuel injectors 340, a manifold 344, which is formed into the second injector ring 302, is employed to couple in fluid connection the fuel injectors 340 to an associated fuel conduit 252. The manifold 344 may be coupled in fluid connection to the manifold 324 of the first injector ring 300, or to an aperture 345 that is formed through the first injector ring 300 as is shown in FIG. 8. The interface between the first and second injector rings 300 and 302 is sealed by a Viton O-ring 346 in an area proximate the aperture 345.

The aft bluff boat-tail 304 includes a flange portion 360 and a flow-effecting portion 362. The flange portion 360 abuts the aft face of the second injector ring 302 and includes a pair of apertures 364 through which conventional socket head cap screws 366 are received. The cap screws 366 extend through similar apertures formed in the first and second injector rings 300 and 302 and the conduit retainer 242 and threadably engage apertures (not shown) in the forward centerbody 240 to fixedly couple these components to one another. The flange portion 360 also includes a hollow center 370 into which a tip 246a of the igniter 246 extends. The hollow center 370 is chamfered on its aft end so as to provide additional space about the tip 246a for a flame kernel.

The flow-effecting portion 362 is coupled to the outer perimeter of the flange portion 360. In the particular embodiment provided, the flow-effecting portion 362 is frusto-conically shaped and includes a plurality of circumferentially spaced apart fuel injectors 380 that are configured to inject fuel in a predetermined direction. Like the second injector ring 302, the flow-effecting portion 362 may be alternately configured to include no fuel injectors (i.e., constituting a "blank" bluff body). Although the injectors 380 are illustrated as being configured to inject fuel in an upstream direction, those skilled in the art will appreciate that the fuel injectors 380 may be alternatively configured to inject fuel in a radially outward direction, a downstream direction or any combination of the radially outward, downstream and upstream directions.

In the example illustrated, the flow-effecting portion has an initial outer diameter that matches the outer diameter of the first and second injector rings 300 and 302. The flow-effecting portion 362 terminates at its aft end at a sharp edge 386 that operates to initiate flow separation and to anchor and radially extend the central recirculation zone 610 (FIG. 13) to increase its size and flameholding capabilities.

Although the centerbody hub assembly 204 has been illustrated thus far as being formed from a plurality of discrete components, those skilled in the art will appreciate that various known manufacturing techniques, including direct metal fabrication, may be employed so as to reduce the actual number of components that are utilized. For example, the forward centerbody 240, the swirl vane pack 206 and the first injector ring 300 may all be unitarily formed, which would thereby eliminate the need for the conduit retainer 242.

Referring to FIG. 9A, the swirl generator 30 of the present invention is schematically illustrated to show several of the various fueling options that may be employed. The fuel injectors 230 may comprise, for example, orifices A, flush-mount simplex injectors B or stand-off simplex injectors C. The fuel injectors of the aft centerbody assembly 244 (i.e., fuel injectors 320, 340, 380 and 840) may include simplex injectors D or orifices E, or may be omitted in part (blank) as designated by reference letter F.

In FIGS. 4, and 10 through 12, the swirl vane pack 206 is illustrated to include a mounting hub 400, a plurality of vanes 402 and a shroud 404. In the particular example provided, the swirl vane pack 206 is an assembly wherein the components comprising the swirl vane pack 206 are fabricated, assembled and fixedly secured to one another. Those skilled in the art will appreciate, however, that alternative fabrication techniques may be employed to reduce the number of components that comprise the swirl vane pack 206. For example, technologies such as hot isostatic pressing, casting and direct metal fabrication may be employed to form the swirl vane pack 206, either wholly or partially, or in combination with the centerbody assembly 236 or portions thereof as described above.

The mounting hub 400 is an annular structure that is received over the mounting flange 274 (FIG. 9) of the forward centerbody 240 (FIG. 9) in juxtaposed relation with the abutting flange 278 (FIG. 9) of the forward centerbody 240 and the front face of the first injector ring 300 (FIG. 9).

The cap screws 366 (FIG. 8) exert a clamping force that fixedly but removably secures the aft centerbody 244 to the forward centerbody 240. As the mounting hub 400 abuts the mounting flange 274 and the front face of the first injector ring 300, the clamping force is also transmitted between the abutting flange 278 and the front face of the first injector ring 300, which operates to fixedly secure (both axially and radially) the mounting hub 400 therebetween.

Figure 10:
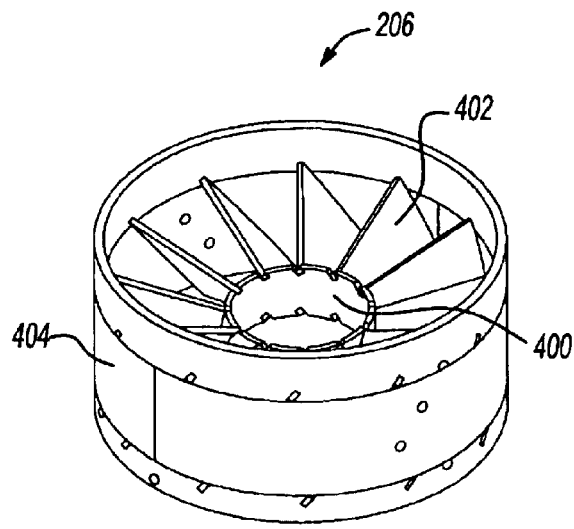
FIG. 10 is a perspective view of a portion of the swirl generator illustrating the swirl vane pack in greater detail.
Figure 10A:
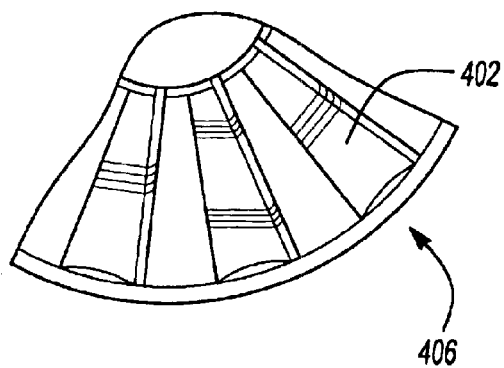
FIG. 10A is a partial top plan view of an alternately constructed swirl vane pack illustrating a profiled vane configuration.
Figure 11:
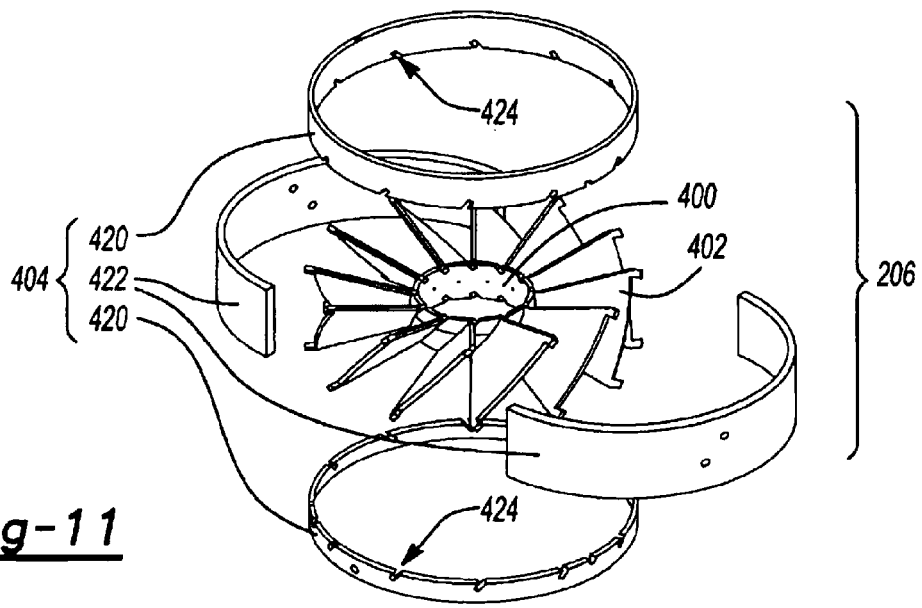
FIG. 11 is an exploded perspective view of the swirl vane pack of FIG. 10.

The vanes 402 of the swirl vane pack 206 are configured with a swirl number that ranges from about 0.4 to about 1.2 so as to permit the combustor/nozzle portion 40 to achieve a combustor length-to-diameter (L/D) ratio (as measured from a plane at which the dump step 636 in FIG. 13 to the throat of the nozzle portion 40b) that is less than about 2.0, and preferably less than about 1.6 and more preferably about 1.0 or less. In the particular example provided, we utilized twelve vanes 402 having a straight configuration that is skewed to the centerline of the mounting hub 400 so as to provide a swirl number of 0.54. Those skilled in the art will appreciate that various other vane configurations may alternatively be employed, including vanes with different skew angles and/or an arcuate or helical profile (FIG. 10A). As the swirl vane pack 206 is comprised of a plurality of discrete components, the vanes 402 are configured with tabs 410a and 410b on their opposite ends. The radially inward tabs 410a are configured to engage apertures 412 that are formed on the opposite faces of the mounting hub 400. The tabs 410a and the apertures 412 cooperate to align the vanes 402 to the mounting hub 400 so that the vanes 402 may be coupled to the mounting hub 400 in a conventional manner, such as brazing or welding.

The shroud 404 includes a pair of end caps 420 and a pair of circumferentially extending portions 422. The end caps 420 include a plurality of apertures 424 that are configured to receive the radially outward tabs 410b on the vanes 402. In a manner similar to that of the apertures 412 of the mounting flange 274, the apertures 424 cooperate to align the vanes 402 to the end caps 420. The circumferentially extending portions 422 are disposed around the perimeter of the vanes 402 between the tabs 410b and the end caps 420, circumferentially extending portions 422 and vanes 402 are fixedly secured together, as through welding.

With reference to FIG. 4, the swirl vane pack 206 is illustrated to be fixedly coupled to the centerbody hub assembly 204 in the manner described above and disposed between the wall injector assembly 208 and a recessed step 500 formed in the upper inlet housing segment 200a. In this location, the trailing edges of the vanes 402 of the swirl vane pack 206 are located upstream of all fuel injection sites, which eliminates any potential for flashback which would damage the vanes 402. The shroud 404 of the swirl vane pack 206 is preferably sized to engage in a press-fit manner the recessed step 500 in the lower inlet housing segment 200b to thereby structurally couple the swirl vane pack 206 and the centerbody hub assembly 204 to the inlet housing 200.

The swirl generator 30 is configured such that the vanes 402 impart tangential velocities to the axial inlet flow 150 to convert the inlet flow 150 into a spiraling, three dimensional swirling flow structure or flowfield 510 (FIG. 4). The flowfield 510 has a dramatic effect on the rate of fuel mixing, atomization, droplet vaporization, flame propagation, combustion efficiency, combustion stability, combustion intensity and widens flammability limits. Those whom are skilled in the art will appreciate that radial velocities will be affected by the swirling effect, but that the major impact of swirling effect concerns the aforementioned tangential velocity component.

With reference to FIG. 13, the high tangential velocities produced by the vanes 402, whether straight or profiled in their configuration, creates a very intense shear layer 600 and enhances the large scale vortex or central recirculation zone 610 that is generated and anchored by the bluff end 614 of the aft centerbody 244, even at relatively low levels of swirl (i.e., a level of swirl that is greater than or equal to about 0.4). In the case of vanes 402 having a flat configuration, especially high shear stresses are created that promote very efficient mixing of the fuel that is introduced into the inlet housing 200 via the wall injector assembly 208 and the injectors 320, 340 and 380 in the aft centerbody 244 due to high intensity turbulence that is generated by the trailing edge vortices that are induced by the flow separation on the lee side of the vanes 402. Combustion in the central recirculation zone 610 is initiated by a flame kernel 630 that is produced by the igniter 246 that is housed in the centerbody hub assembly 204. Additionally or alternatively, igniters 80a (similar or identical to igniter 246 or igniter 80) may also be employed near the dump plane 636a.

The inlet ramp 212, which is optional, aids in increasing the size of the dump step 636 that occurs at the dump plane 636a. In the particular example provided, the inlet ramp 212 helps to create a relatively large 90° dump step 636 at the transition between the inlet housing 200 and the inlet of the combustor 40a that serves to considerably improve flame propagation rates and the combustor's operability limits. More specifically, the dump step 636 creates a toroidal outer recirculation zone 640 along the combustor wall that is initially ignited by a flame kernel that is produced by the torch igniter 80 or the igniter(s) 246 and/or 80a (FIG. 4). The length of the outer recirculation zone 640 is a function of the height of the dump step 636 and the strength of the swirl number of the swirl vane pack 206. Generally speaking, for a given constant swirl number, the length, size and robustness of the outer recirculation zone 640 are directly related to the height of the dump step. The inlet ramp 212 and its shape not only provide a means to easily tune the flow height of the dump step 636 and the flow direction, but also increases the local flow velocities to thereby intensify the separated shear layer turbulence and increases the rate of mass entrainment of fuel into the shear layer. The ramp shape and reduced flow gap height also accelerates early merging of the shear layers 650 and 600 of the outer recirculation zone 640 and the central recirculation zone 610, respectively, which is essential for combustors having a relatively short length. Those skilled in the art will appreciate that the shape of the ramp can be altered to change the maximum height and, therefore, the volume of the outer recirculation zone and the gaps between the outer and central recirculation zones.

Portions of the fuel that are dispensed by the fuel injectors 320, 340 and 380 are employed to substantially fuel the central recirculation zone 610, while portions of the fuel that are dispensed by the fuel injectors 230 of the wall injector assembly 208 are employed to fuel both the outer recirculation zone 640 and fuel the central recirculation zone 610. Any portions of the fuel that is dispensed by the injectors 230, 320, 340 and 380 that is not employed to fuel the central or outer recirculation zones 610 and 640 is employed to generally fuel the main core flow 700, which as those skilled in the art will appreciate, consists of the entire flow of combusting fuel and air except the central recirculation zone 610 and the outer recirculation zone 640. The central recirculation zone 610 and the outer recirculation zone 640, once formed, contain a fixed trapped mass. An exchange of mass occurs between each of the central and outer recirculation zones 610 and 640 and the core flow 700, but there is no net change in mass for steady flow conditions in either of the central and outer recirculation zones 610 and 640.

As each of the injectors 320, 340 and 380 are coupled in a discrete manner to the fuel source 126, the amount of fuel that is dispensed by the injectors 320, 340 and 380 may be tailored in a desired manner to fine tune flame stabilization and combustion performance during throttling. Accordingly, the injectors 320, 340 and 380 may be independently controlled so as to provide a relatively wide range of flexibility to control combustor characteristics, depending on a particular application.

The shear layers 650 and 600 of the outer recirculation zone 640 and the central recirculation zone 610 provide reduced velocity regions to hold the flame, and maintain and propagate the combustion process. More specifically, the outer recirculation zone 640 and the central recirculation zone 610 provide flame stabilization and act as a robust ignition source for the core flow 700 by supplying heat and recirculated chemically reacting by-products, such as OH, H and O radicals, to the main fuel/air mixture of the combustor 40a. In this regard, each recirculation zone carries the heat and chemically active species from the flame in the respective shear layer and recirculating flow volume upstream where they act to ignite the fresh combustible fuel/air mixture entering the shear layer to thereby provide a continuous pilot for the core flow 700.

Figure 14:
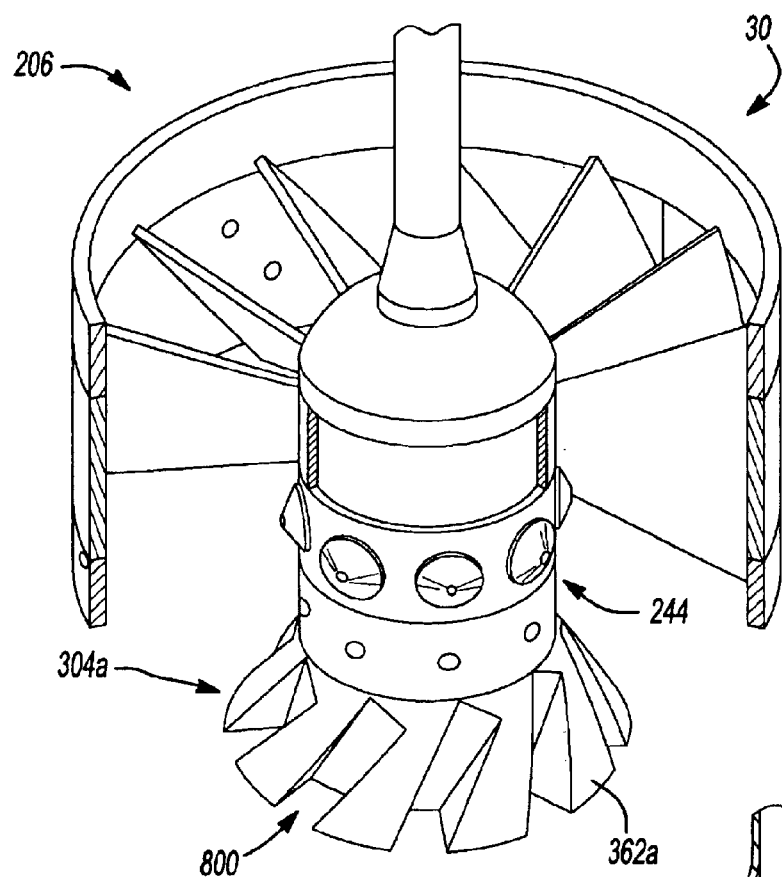
FIG. 14 is a partially broken away perspective view of a portion of a swirl generator constructed in accordance with the teachings of an alternate embodiment of the present invention.

As noted above, the aft centerbody 244 of the swirl generator 30 may be configured in various different arrangements to achieve desired design parameters. For example, the aft centerbody 244 may be configured with a channeled aft bluff boat-tail 304a as illustrated in FIG. 14. The aft bluff boat-tail 304a is generally similar to the aft bluff boat-tail 304 of FIG. 8, except that it includes a plurality of channels 800 that are formed about the perimeter of the flow-effecting portion 362a. The channels 800 are formed at an angle relative to the centerline of the aft bluff boat-tail 304a that maintains the effective flow direction provided by the swirl vane pack 206. Those skilled in the art will appreciate that other channels may be selected to control turbulent transport and mixing including ones that are opposite of the tangential direction provided by the swirl vane pack. The ramp-like geometry of the channels produces a spectrum of turbulence scales that enhances mixing to promote flame intensity and propagation from the central recirculation zone 610 into the core flow 700 (FIG. 13). Like the aft bluff boat-tail 304, the aft bluff boat-tail 304a may include one or more fuel injectors, or may have a "blank" configuration (i.e., a configuration without one or more fuel injectors).

Figure 15:
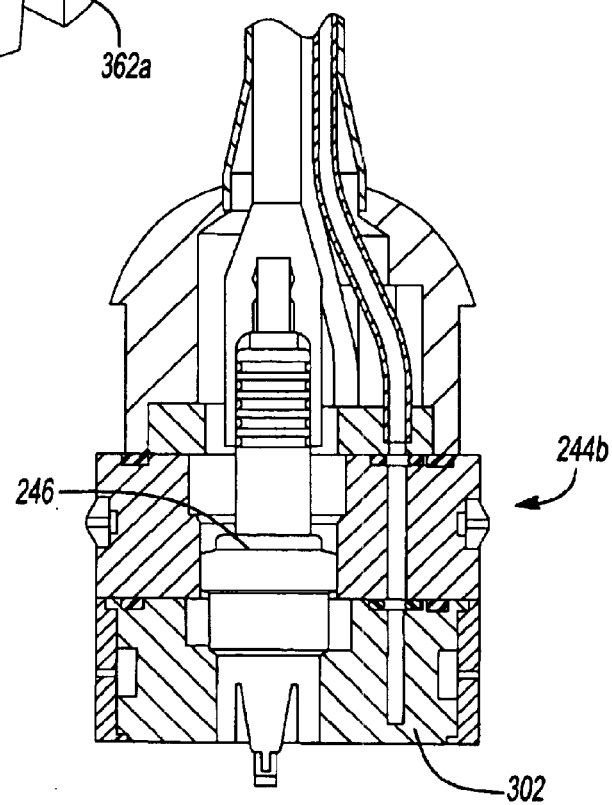
FIG. 15 is a sectional view of a portion of a swirl generator constructed in accordance with the teachings of a second alternate embodiment of the present invention which illustrates an alternatively constructed centerbody hub assembly in detail.

In the embodiment of FIG. 15, the aft centerbody 244b is illustrated to be generally similar to the aft centerbody 244 of FIG. 9, except that it does not include a discrete bluff body. In this regard, the second injector ring 302 essentially forms a bluff body as the aft centerbody 244b terminates abruptly at the rear face of the second injector ring 302.

Figure 16:
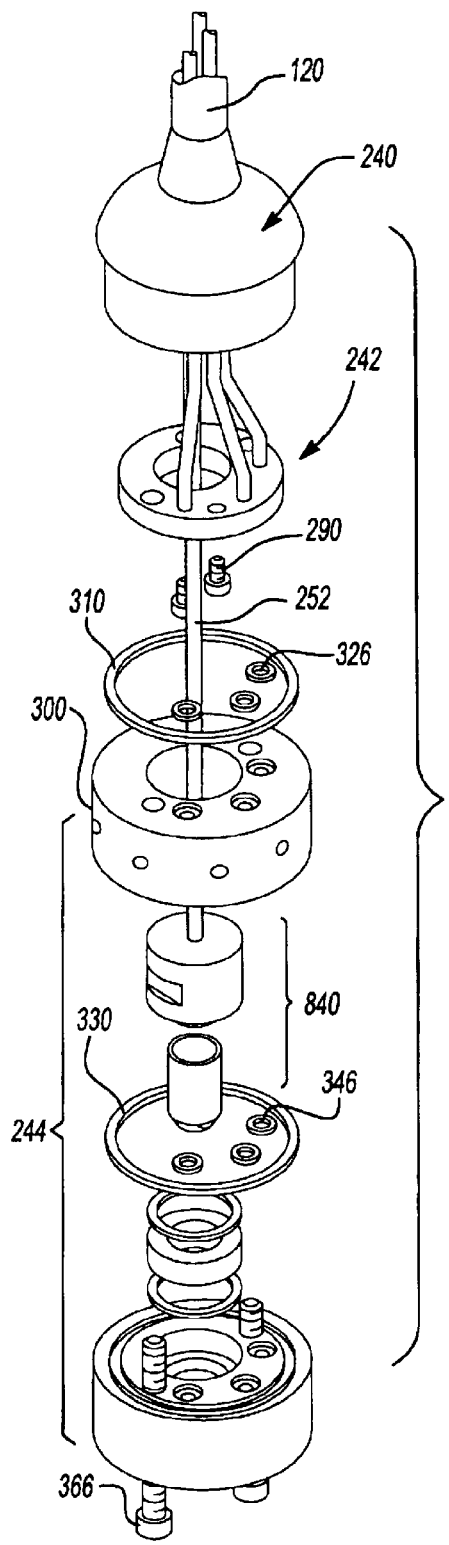
FIG. 16 is an exploded perspective view of a portion of a swirl generator constructed in accordance with the teachings of a third alternate embodiment of the present invention which illustrates another alternatively constructed centerbody hub assembly.
Figure 17:
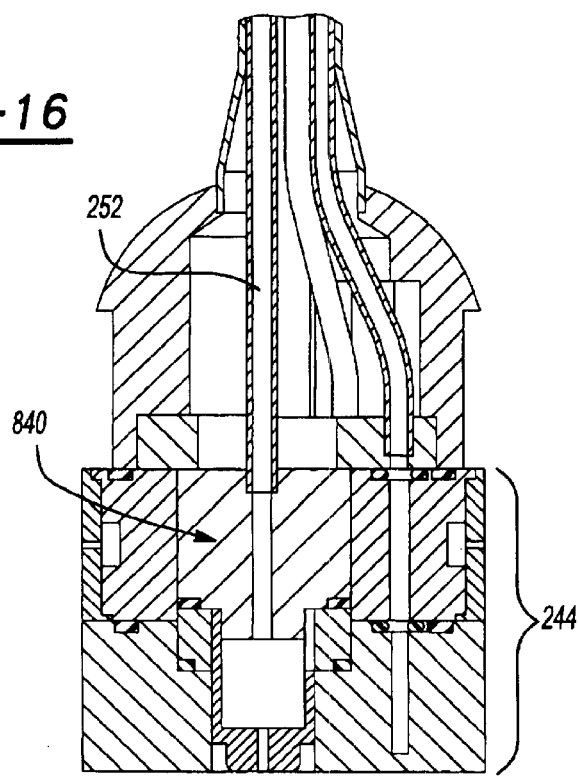
FIG. 17 is a longitudinal section view of the centerbody hub assembly of FIG. 16.

The embodiment of FIGS. 16 and 17 is generally similar to that of FIG. 15 except that the igniter 246 has been replaced with a fuel injector 840, such as a simplex atomizer having, for example, a 100° spray angle. The fuel injector 840, like the previously discussed fuel injectors that are housed in the aft centerbody 244, is individually coupled to a fuel conduit 252 so as to permit the fuel injector 840 to be selectively deployed. In this embodiment, the central recirculation zone is also ignited by the flame kernel that is produced by the torch igniter 80 and/or the igniter 80a that are described above as initiating combustion in the outer recirculation zone.

Figure 18:
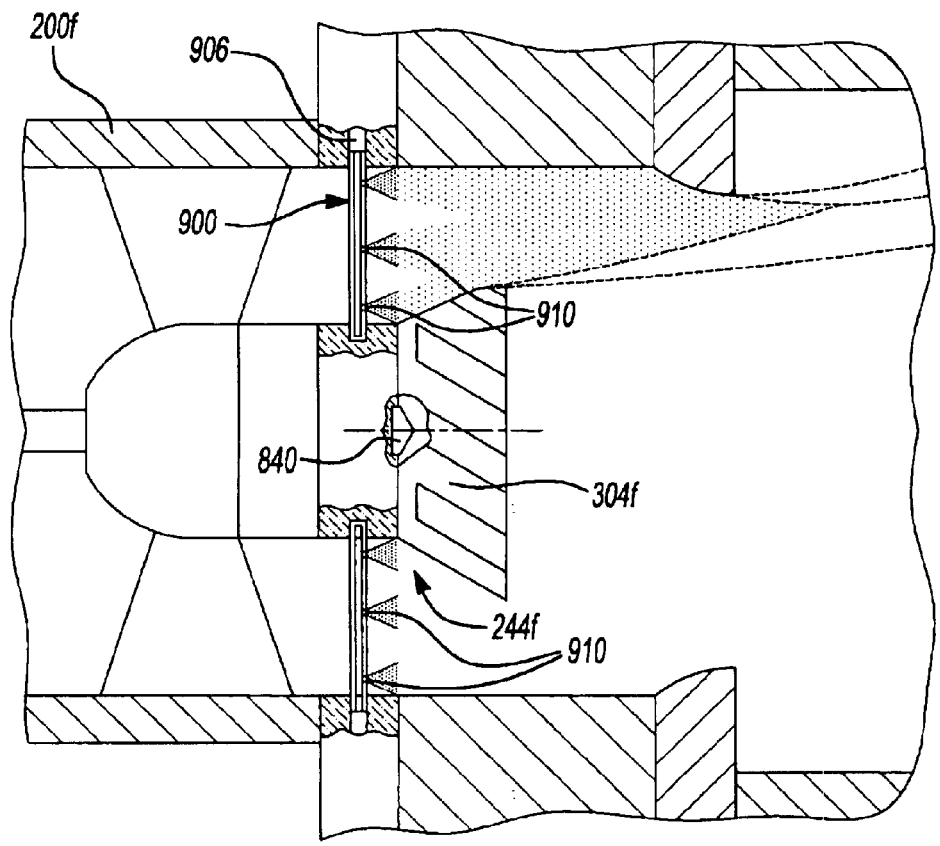
FIG. 18 is a partially broken away side elevation view of a swirl generator constructed in accordance with the teachings of a fourth alternate embodiment of the present invention.

Another embodiment is illustrated in FIG. 18 wherein the fuel injectors in the wall of the inlet housing 200f are replaced by a plurality of cross-flow strut injectors 900. Each of the cross-flow strut injectors 900 is swaged into the aft centerbody 244f for structural support and coupled in fluid connection to fuel conduits 906 that extend through the inlet housing 200f. Each cross-flow strut injectors 900 has a plurality of orifices 910 that promote atomization of the fuel flowing therethrough. Additionally, this embodiment includes a channeled aft bluff boat-tail 304f and a centermount fuel injector 840.

Figure 19:
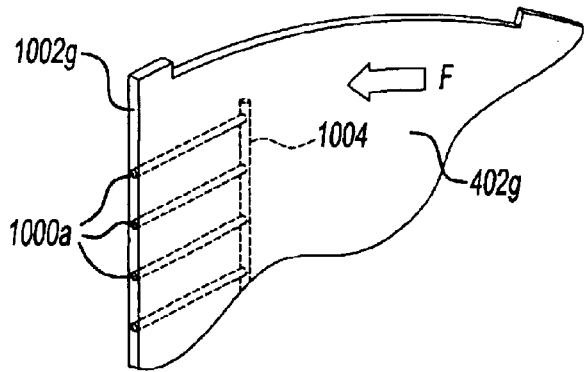
FIG. 19 is a perspective view of a portion of a swirl generator constructed in accordance with the teachings of a fifth alternative embodiment of the present invention which illustrates a vane for an alternative swirl vane pack with a plurality of fuel injection sites.
Figure 20:
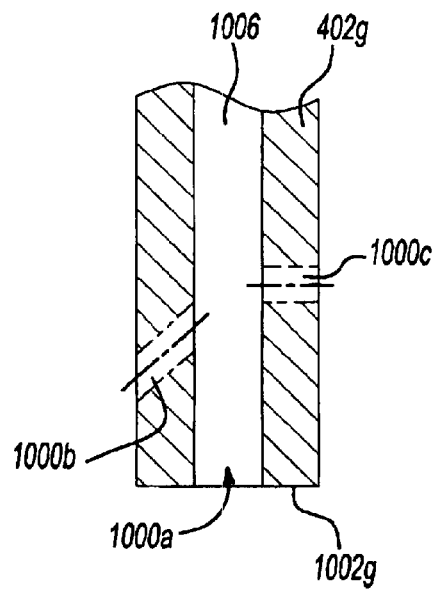
FIG. 20 is a partial sectional view of the vane of FIG. 19.

The embodiment of FIGS. 19 and 20 provides a fuel injection scheme that is very similar to that of the embodiment of FIG. 18. Instead of cross-flow strut injectors, however, this embodiment utilizes a plurality of fuel injection sites 1000a that are formed into a trailing edge 1002g of at least a portion of the vanes 402g of the swirl vane pack. The injection sites 1000a are coupled in fluid connection to an associated fuel conduit that extends through the conduit 120 (FIG. 4); a plurality of internal channels 1004 in the vanes 402g serve to transmit the fuel through the vanes 402g to the injection sites 1000a. As illustrated in FIG. 20, each of the injection sites 1000a is an orifice 1006 that has an appropriate length to diameter ratio and which is formed into the trailing edge 1002g at a predetermined angle relative to an axis of the vane 402g. Although the injection sites 1000a are illustrated as being generally oriented in a downstream direction, those skilled in the art will appreciate that additionally or alternatively the injection sites could also be skewed to the axis of the vane 402g. Additionally or alternatively, the holes 1006 may be formed on a lateral surface of the vanes 402g to inject fuel in a desired direction (see, e.g., injection sites 1000b and 1000c in phantom in FIG. 20, which are also formed with an appropriate orifice length to diameter ratio). Despite the complexity of the vane arrangement, this embodiment is advantageous in that the exterior surfaces of the vanes 402g form an effective means for transferring heat from the air flow to the fuel in the vanes 402g which operates to cool the swirl vane pack as well as to increase the temperature of the fuel that is injected, which tends to increase the rate by which the fuel is mixed (i.e., improve atomization, decrease the size of the droplets in the fuel spray and directly increase the rate of droplet vaporization).

Figure 21:
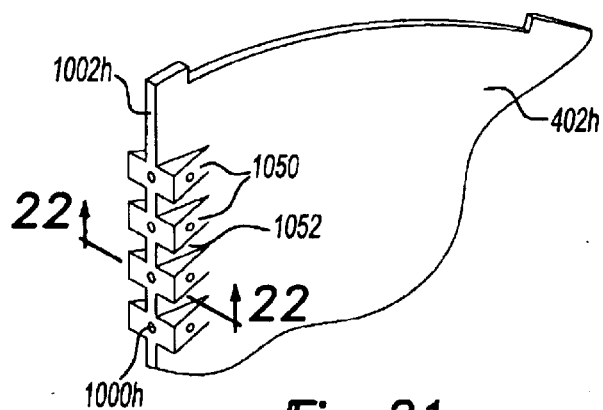
FIG. 21 is a perspective view of a portion of a swirl generator constructed in accordance with the teachings of a sixth alternative embodiment of the present invention which illustrates a vane for an alternative swirl vane pack with turbulator ramps and a plurality of fuel injection sites.
Figure 22:
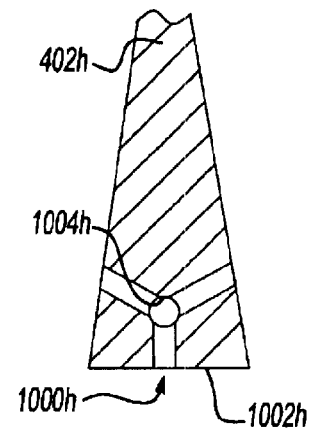
FIG. 22 is a partial sectional view taken through the vane of FIG. 21.

The embodiment of FIGS. 21 and 22 is generally similar to that of FIGS. 19 and 20, except that an array or row of turbulator ramps 1050 are formed or mounted onto at least a portion of the vanes 402h of the swirl vane pack 206 to further enhance mixing. The turbulator ramps 1050 and the channels 1052 that are formed between each pair of turbulator ramps 1050 are employed to generate vortices that emanate from the trailing edge 1002h of the vanes 402h; the vortices enhance turbulent transport and provide highly controlled fine scale mixing. Like the previous embodiment, a plurality of fuel injection sites 1000h that are formed into a trailing edge 1002h (i.e., into the tubulators 1050) which are coupled in fluid connection to an associated fuel conduit that extends through the conduit 120 (FIG. 4); a plurality of integrally formed channels 1002h in each of the vanes 402h serve to transmit the fuel through the vanes 402h. Those skilled in the art will also appreciate that the turbulators 1050 may also be utilized in vane configurations that do not inject fuel (i.e., in vanes without injection sites formed therein).

Figure 23:
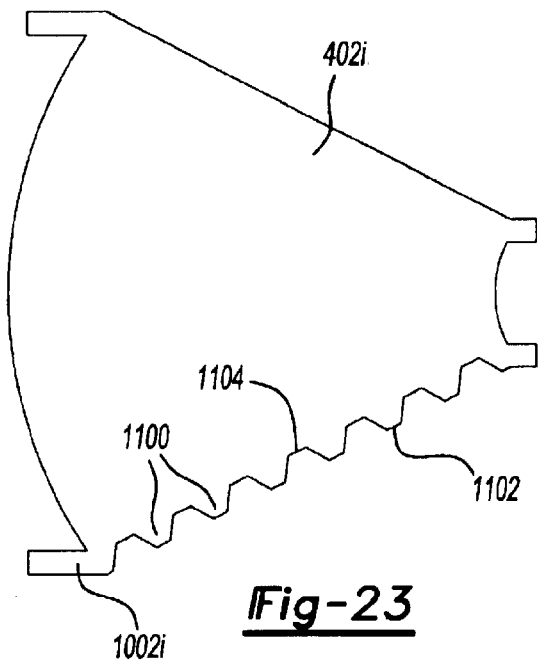
FIG. 23 is a front elevation view of a swirl generator constructed in accordance with the teachings of a seventh alternative embodiment of the present invention which illustrates a vane for a third alternative swirl vane pack having scallops.

The example of FIG. 23 is generally similar to that of FIG. 4, except that the trailing edge 1002i of the vanes 402i includes a plurality of scallops 1100 rather than turbulators.

The scallops 1100 are illustrated to be formed in a uniform manner wherein the crest 1102 is relatively wider than the root 1104. Those skilled in the art will appreciate, however, that the scope of the present invention is not limited to any particular scallop pattern. Those skilled in the art will appreciate, too, that the vanes 402i may also be configured with a plurality of fuel injection sites in the manner described above for the embodiments of FIGS. 19 through 22.

Figure 24:
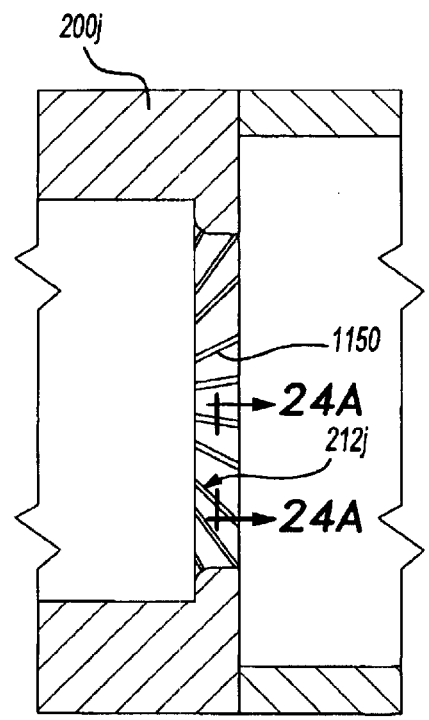
FIG. 24 is a partial sectional view of a swirl generator constructed in accordance with the teachings of a eighth alternative embodiment of the present invention which illustrates an alternative inlet housing wherein a plurality of channels are formed into the inlet ramp.
Figure 24A:
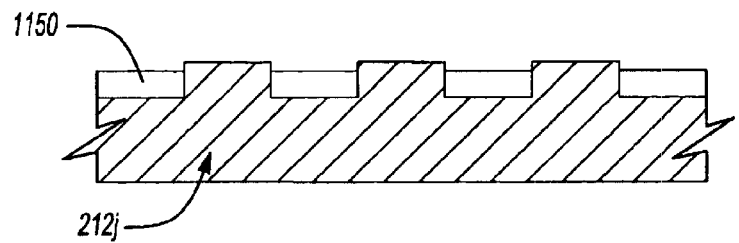
FIG. 24A is a sectional view taken along the line 24A—24A of FIG. 24.

In the embodiment of FIGS. 24 and 24A, the inlet ramp 212j is illustrated to be generally similar to the inlet ramp 212 of FIG. 4, except that a plurality of channels 1150 are formed about the perimeter of the inlet ramp 212j. The channels 1150 are formed at a predetermined angle relative to the longitudinal axis of the inlet housing 200j and serve to enhance turbulent transport and fine scale mixing.

Figure 25:
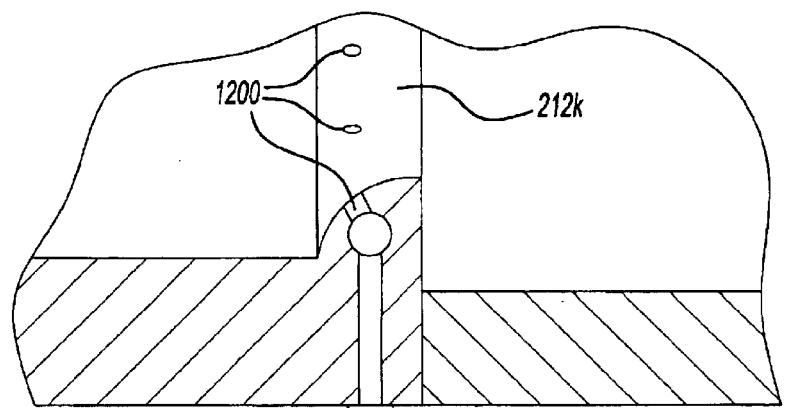
FIG. 25 is a partial sectional view of a swirl generator constructed in accordance with the teachings of a ninth alternative embodiment of the present invention which illustrates another alternative inlet housing illustrating the incorporation of fuel injection sites into the inlet ramp.

In the embodiment of FIG. 25, a plurality of circumferentially spaced apart fuel injection sites 1200 are formed about the circumference of the inlet ramp 212k. The fuel injection sites 1200 are operable for injecting fuel into the flow field which aids in flame stabilization and communication between the outer and central recirculation zones. As those skilled in the art will appreciate, the channels of the previous embodiment may additionally be incorporated into the inlet ramp 212k.

Figure 26:
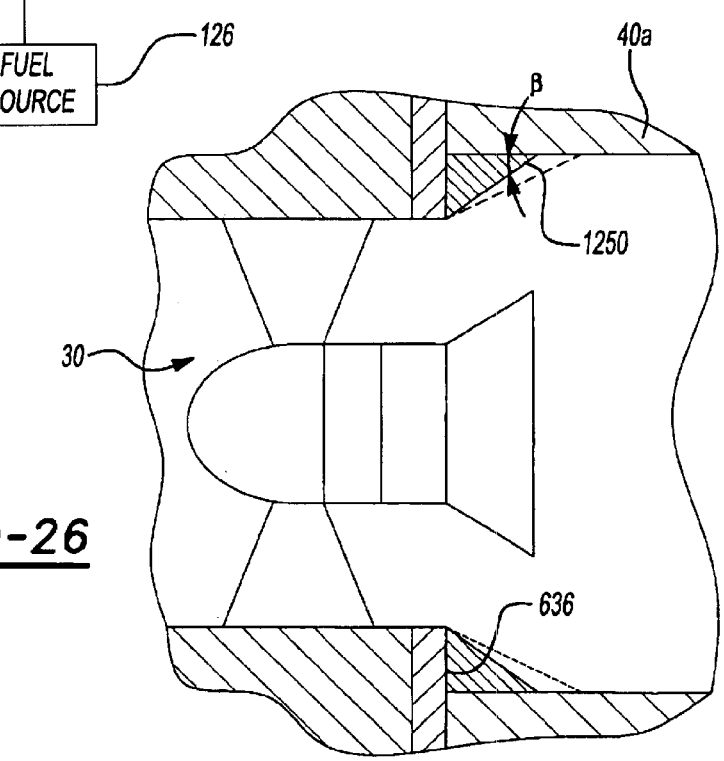
FIG. 26 is a partial sectional view of a swirl generator constructed in accordance with the teachings of a tenth alternative embodiment of the present invention which illustrates an alternative combustor illustrating the use of a quarl extension.

Those skilled in the art will appreciate that the wall of the combustor 40a in an area proximate to the outer recirculation zone tends to absorb a relatively large amount of heat during the combustion process. An optional quarl expansion 1250 may be provided as shown in FIG. 26 at the dump step 636. The quarl expansion 1250 is an annular element having a generally triangular cross section; the quarl expansion 1250 is employed to "fill" the backwards facing step at the dump plane such that the angle of the dump step 636 is reduced from 90°. The angle β of the quarl expansion 1250 may be varied in a known manner to affect the size of the central recirculation zone and the rate of heat transfer to the wall of the combustor 40a and the inlet housing 200.

Figure 27:
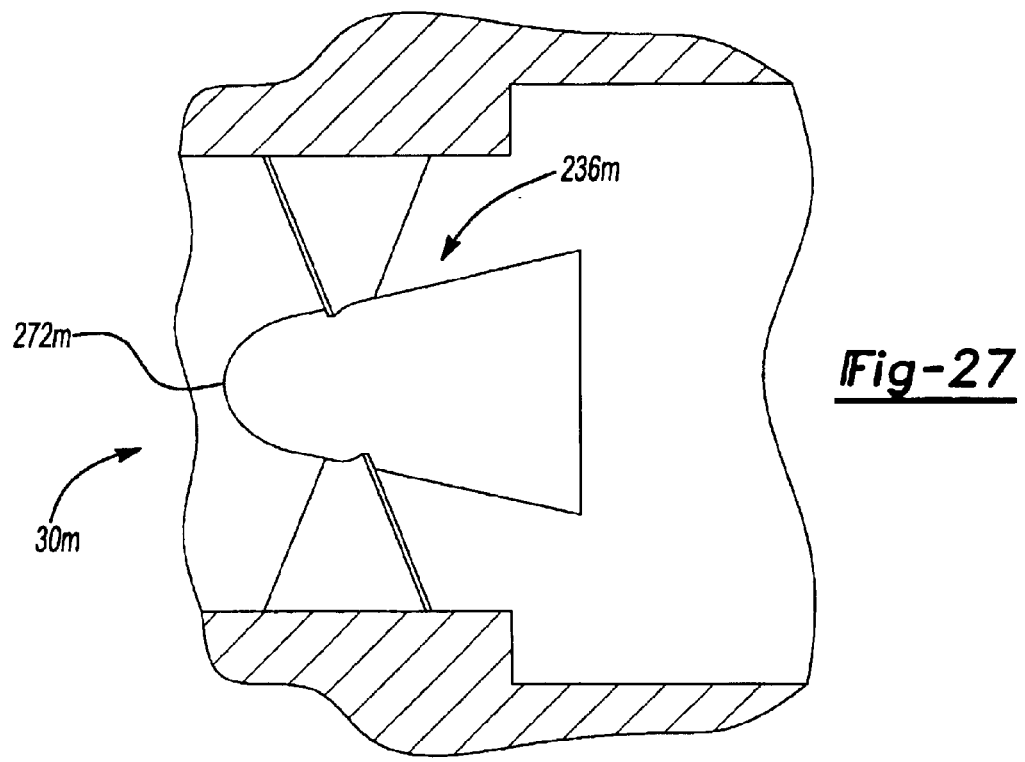
FIG. 27 is a partial sectional view of a swirl generator constructed in accordance with the teachings of a eleventh alternative embodiment of the present invention which illustrates another alternately configured centerbody hub assembly.

The embodiment of FIG. 27 illustrates that the configuration of the centerbody assembly aft of the leading surface need not have the configuration of a right cylinder. In the particular embodiment illustrated, the portion of the centerbody assembly 236m aft of the leading surface 272m has a generally frusto-conical shape that is symmetrical about a longitudinal axis of the swirl generator 30m. Those skilled in the art should also appreciate that the portion of the centerbody assembly that is positioned aft of the leading surface may be other than conical (e.g., ogival). Those skilled in the art will also recognize that multiple fuel injection sites, similar to fuel injectors 320, 340, 380 and/or 840 of FIGS. 8 and 16 could be incorporated into the centerbody assembly 236m.

Figure 28:
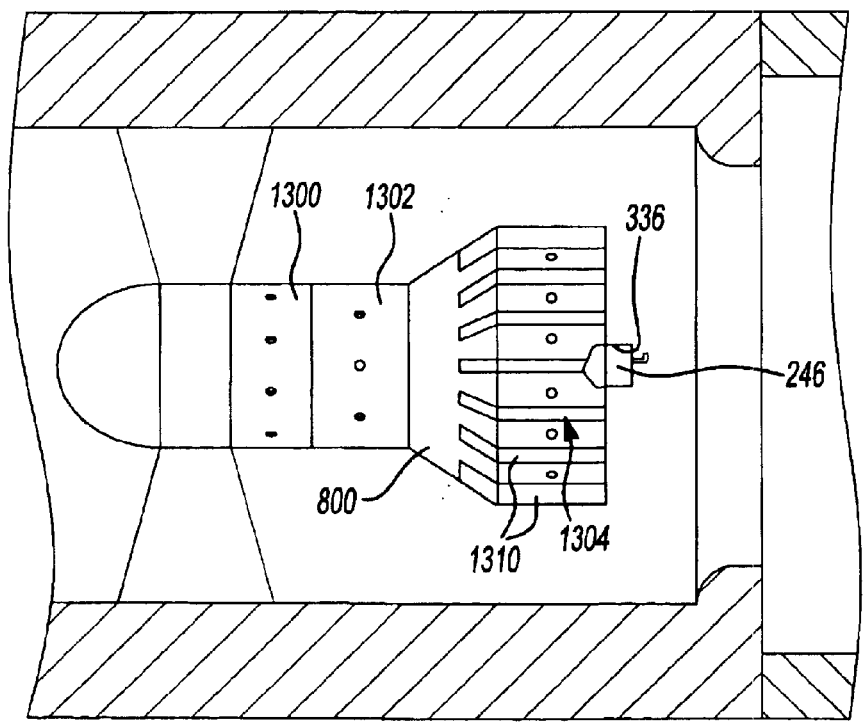
FIG. 28 is a partial sectional view of a swirl generator constructed in accordance with the teachings of a twelfth alternative embodiment of the present invention which illustrates another alternately configured centerbody hub assembly.

The embodiment of FIG. 28 is generally similar to the embodiment of FIG. 14 in that it includes two injection rings 1300 and 1302 that are positioned forwardly of the aft bluff boat-tail 304a. This embodiment differs from the embodiment of FIG. 14 in that the injection rings 1300 and 1302 are configured in a manner that is generally similar to that of the first injection ring 300 and a third injection ring 1304 is coupled to the aft end of the aft bluff boat-tail 304a. The injection ring 1304 is configured generally similar to that of the second injection ring 302 discussed above (i.e., includes fuel injectors and threadably engages the threaded portion 336 of the igniter 246). Additionally, the injection ring 1304 includes a plurality of optional grooves or channels 1310 that may be continuous with the grooves or channels of the bluff boat-tail body 800 which produces a spectrum of turbulent scales that enhance fuel and air transport and fine scale mixing to promote flame intensity and propagation from the central recirculation zone 610 into the core flow 700. As those skilled in the art will appreciate, the injection rings 1300, 1302 and/or 1304 may be "blank" and/or may include grooves or channels 1310 for producing fine scale turbulence. Furthermore, the injection ring 1304 may be configured with an aft facing fuel injector such as that which is shown in FIGS. 16 and 17.

Figure 29:
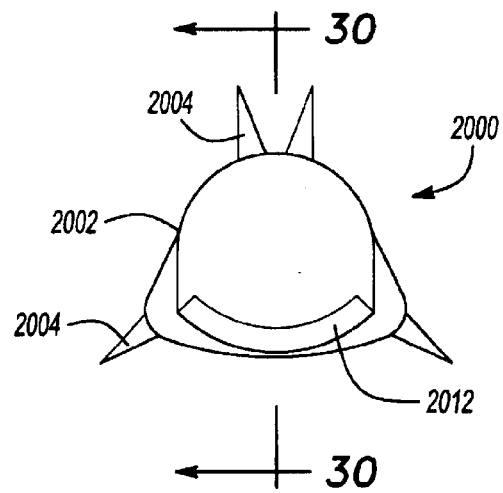
FIG. 29 is a front elevation view of a ramjet missile that incorporates a swirl generator constructed in accordance with the teachings of the present invention.
Figure 30:
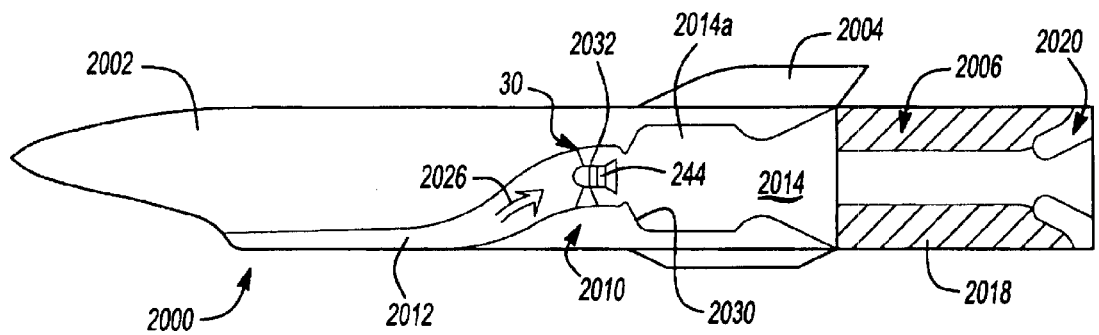
FIG. 30 is a longitudinal section view taken along the line 30—30 of FIG. 29.

While the swirl generator of the present invention has been illustrated and described thus far as being a component of a lift thrust augmentor, those skilled in the art will appreciate that the invention, in its broader aspects, may be utilized in diverse other applications. In FIGS. 29 and 30, for example, the swirl generator 30 is illustrated in conjunction with a ramjet missile 2000.

In this example, the ramjet missile 2000 includes a forebody 2002, fins 2004, a booster engine 2006 and a ramjet engine 2010 having an air inlet 2012, the swirl generator 30 and a ramjet combustor/nozzle 2014. The forebody 2002 conventionally houses the payload (not shown), the fuel (not shown), batteries (not shown) and the control portion (not shown) of the ramjet missile 2000, while the fins 2004 conventionally stabilize and guide the ramjet missile 2000. The air inlet 2012 includes a movable or consumable cover (not shown) that is selectively operable for sealing the air inlet 2012 during the operation of the booster engine 2006. In the example provided, the booster engine 2006 includes a solid propellant 2018 that burns during a boost phase of the missile's operation; hot combustion by-products are expelled from the nozzle 2020 of the booster engine 2006 to generate thrust.

Subsequent to the boost phase of the missile's operation, the booster engine 2006 of the exemplary ramjet missile illustrated is ejected, the movable cover is translated or consumed so as to permit air to flow into the air inlet 2012 and the task of propulsion switches from the booster engine 2006 to the ramjet engine 2010. The speed of the ramjet missile 2000 at this cruise stage and the configuration of the air inlet 2012 cooperate to induce an airflow 2026 through the air inlet 2012 that is directed toward the swirl generator 30. Although not shown, those skilled in the art will appreciate from the above discussion that flow guide vanes (similar to the flow guide vanes 96 in the elbow 60) may be employed in the air inlet 2012 to provide an axisymmetric (i.e., uniform and axial) airflow to the swirl generator 30. Those skilled in the art will recognize that a nose inlet may be used followed by an annular air transfer duct that acts as an isolator and carries the air aft to the swirl generator 30 and the combustor of the ramjet combustor/nozzle 2014. The swirl generator 30 is employed to generate a turbulent flowfield and to inject fuel therein in the manner described above. As in the example of the lift thrust augmentor, the swirl generator 30 operates to form both an outer recirculation zone (proximate the dump step 2030 at the transition between the inlet housing 2032 and the inlet of the combustor/nozzle 2014), as well as a central recirculation zone (which is anchored by the aft end of the aft centerbody assembly 244).

Integration of the swirl generator 30 into the ramjet missile 2000 permits significant reductions to the L/D ratio of the combustor 2014a, which in turn affords substantial reductions in the overall weight of the ramjet missile 2000. Furthermore, the swirl generator 30 provides relatively high combustor efficiency so that a booster engine 2006 may be separately packaged and thus be ejectable as the propulsion switches from the booster engine 2006 to the ramjet engine 2010.

Figure 31:
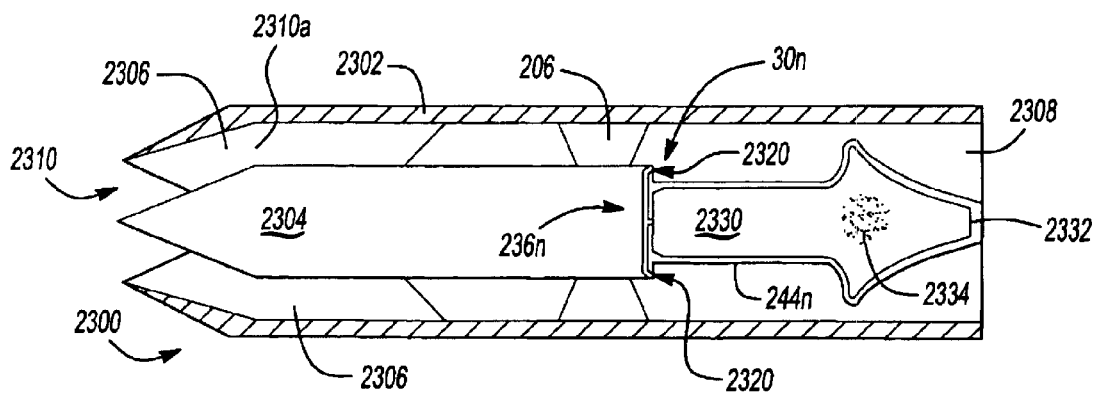
FIG. 31 is a longitudinal section view of a ramshell that incorporates a swirl generator constructed in accordance with the teachings of the present invention.

Another application is illustrated in FIG. 31 wherein the swirl generator 30n is illustrated in conjunction with a ramshell 2300. The ramshell 2300 is a gun-launched projectile that employs the above-described ramjet technology to accelerate the ramshell 2300 to a velocity of about Mach 4 to about Mach 6 to minimize the time to target and maximize the penetration capability of the projectile. The ramshell 2300 includes a housing 2302, a projectile 2304, a plurality of inlet struts 2306, the swirl generator 30n and a combustor/nozzle portion 2308.

The housing 2302 is a hollow shell that is inwardly tapered at it's front end to define an air inlet 2310. The inlet struts 2306 are fixedly coupled to the interior of the housing 2302 and to the projectile 2304 to centrally mount the projectile 2304 in a forward portion of the housing 2302. As the ramshell 2300 is spin-stabilized, the inlet struts 2306 have a spiral shape to maintain alignment with the incoming air flow. The air flow is compressed through the inlet section 2310a and shocked to subsonic velocities near the aft end of the inlet struts 2306. While the projectile 2304 is illustrated as being a solid metallic rod, those skilled in the art will appreciate that any form of payload, including an explosive charge, may be employed in the alternative.

The swirl generator 30n is mounted on the aft end of the projectile 2304 and the swirl vane pack 206 serves to support the housing 2302 aft of the inlet struts 2306. Fuel injection is somewhat different from that of the swirl generator 30 of FIG. 4 in that the primary purposes of the swirl generator 30n are to augment the central recirculation zone (similar to the central recirculation zone 610 of FIG. 13) and to control the rate of mixing in the shear layer above the central recirculation zone and to control the rate of flame propagation into the core flow. Accordingly, wall injection is not employed in this embodiment, and the fuel injectors 2320 in the centerbody assembly 236n are fueled by a reservoir 2330 that is internal to the aft centerbody assembly 244n. The reservoir 2330 includes a pressurized bladder 2332 that surrounds the fuel 2334 to maintain the pressure of the fuel 2334 at sufficient levels during the operation of the ramshell 2300. The centrifugal force of the rotating fuel 2334 in the reservoir 2330 keeps the cooler, high density liquid fuel against the outer perimeter of the reservoir 2330 to assist in thermal protection of the combustor/nozzle portion 2308.

Fuel injection in the ramshell 2300 is preferably designed to maintain a somewhat fuel-rich condition in the central recirculation zone. As the main propulsive combustion initiates in the shear layer above the central recirculation zone, the level of mixing and heat release is controlled through the design of the swirl generator 30n so that only the air flow in the vicinity of the shear layer is burned. Operation in this manner leaves the outer region near the interior side of the housing 2302 relatively cooler and protects the housing 2302 from the high heat flux near the throat of the combustor/nozzle portion 2308, before mixing of the hot combusting gases with the outermost air is complete.

Figure 32:
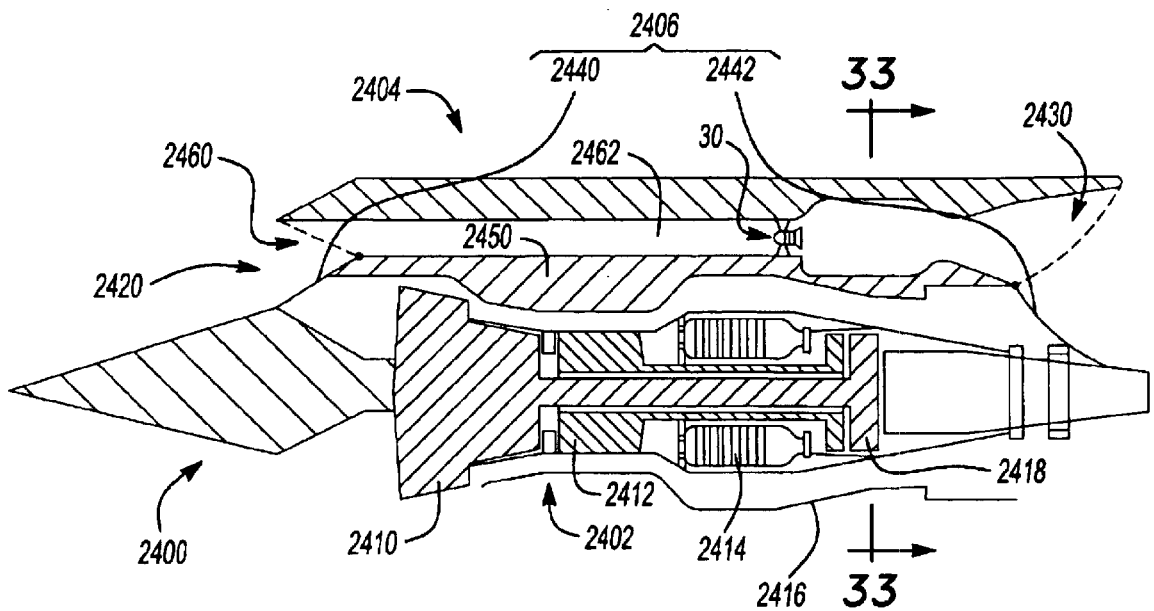
FIG. 32 is a partial longitudinal section view of a combined cycle engine having a plurality of ramjet engines that incorporate a swirl generator constructed in accordance with the teachings of the present invention.
Figure 33:
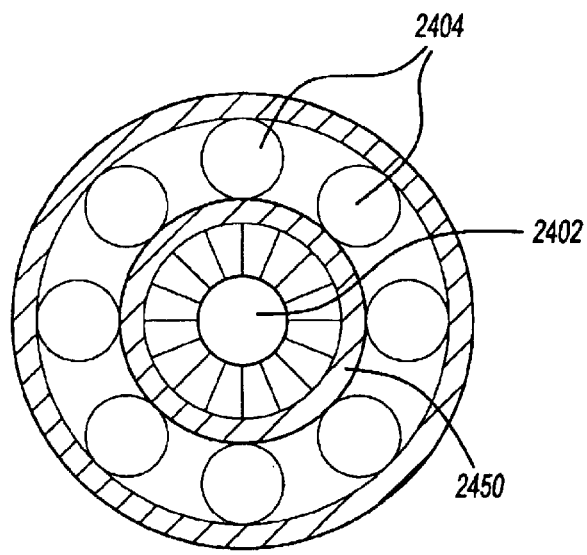
FIG. 33 is a section view taken along the line 33—33 of FIG. 32.

FIGS. 32 and 33 illustrate yet another application of the swirl generator of the present invention. In this example, a swirl augmented combined cycle engine 2400 is illustrated to include a core turbojet engine 2402, a plurality of ramjet engines 2404 that surround the core turbojet engine 2402 and a flow controller 2406. The core turbojet engine 2402 conventionally includes a low pressure compressor 2410, a high pressure compressor 2412, combustors 2414, an air bypass 2416 and a high pressure turbine 2418. As those skilled in the art will appreciate, the core turbojet engine 2402 may optionally include an afterburner and a variable area nozzle.

The ramjet engines 2404 are configured in a manner that is similar to the ramjet missile of FIG. 29 and 30. Briefly, each of the ramjet engines 2404 includes an air inlet 2420, a swirl generator 30 and a ramjet combustor/nozzle 2430.

The flow controller 2406 is coupled to the core turbojet engine 2402 and includes a forward movable element or diverter 2440, which is employed to selectively control the intake of air into the core turbojet engine 2402 and the ramjet engines 2404, and an aft movable element or diverter 2442, which is employed to selectively close off the outlet of the core turbojet engine 2402 and the ramjet engines 2404. In the particular example provided, the forward and aft movable elements 2440 and 2442 are hingedly mounted to the housing 2450 of the core turbojet engine 2402 and pivotable between a first condition (illustrated in broken line), which closes off the air inlet 2420 and combustor/nozzle 2430, respectively, of each ramjet engine 2404, and a second condition (illustrated in solid line), which closes off the intake side of the low pressure compressor 2410 and the outlet of the high pressure turbine 2418, respectively. The forward and aft movable elements 2440 and 2442 may be moved through any of the various conventionally known means, including hydraulic actuators (not shown).

The core turbojet engine 2402 produces all of the propulsive power that is output by the swirl augmented combined cycle engine 2400 from zero velocity through a predetermined transition-in velocity of, for example, at about Mach 2. Therefore, the forward and aft movable elements 2440 and 2442 are maintained in the first condition at speeds below the predetermined transition-in velocity.

At the predetermined transition-in velocity, the ramjet engines 2404 are activated to provide additional thrust. Flow entering the ramjet engines 2404 is subjected to additional ramjet compression 2460 and is further compressed to subsonic speeds in a transfer duct/shock isolator 2462. The air flow enters the swirl generator 30 and is converted into a highly turbulent flowfield into which fuel is injected in the manner described above. As the core turbojet engine 2402 is also producing thrust, the forward and aft movable elements 2440 and 2442 are maintained in a position between the first and second conditions.

When air speed reaches a predetermined transition-out velocity of, for example, above about Mach 3 to about Mach 4, the forward and aft movable elements 2440 and 2442 are positioned in the second condition and thrust production shifts entirely to the ramjet engines 2404. For flight speeds up to the predetermined transition-out velocity, thrust augmentation may be provided by tapping-off air from the high pressure compressor 12 and burning this air with added fuel (up to stoichiometric conditions) in the ramjet engines 2404.

As those skilled in the art will appreciate, the position of the forward and aft movable elements 2440 and 2442 may be controlled in response to flow sensors (not shown) in a selective manner to thereby affect the amount of air that is directed to the core turbojet engine 2402 and the ramjet engines 2404. Alternatively, the forward and aft movable elements 2440 and 2442 may be controlled such that they move continuously from the first condition to the second condition at a predetermined rate upon the sensing of an air speed equivalent to the predetermined transition-in velocity or other event which would prompt the transition from one propulsion mode to another.

Figure 34:
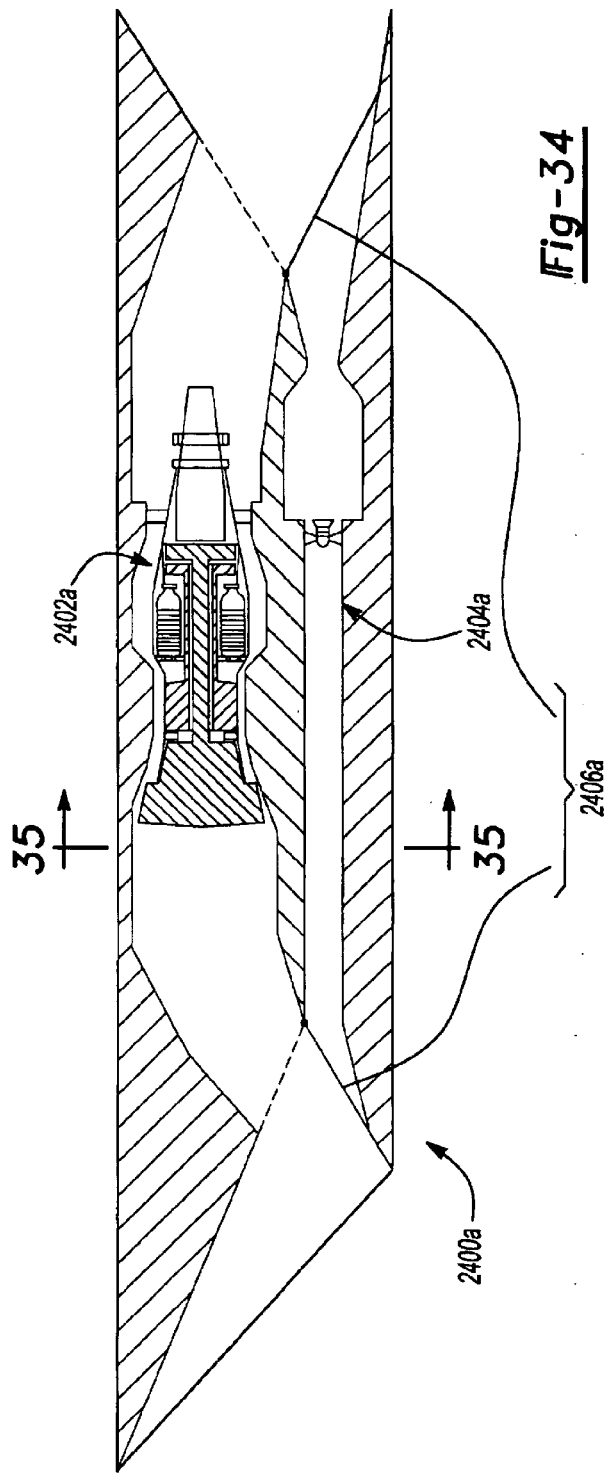
FIG. 34 is a partial longitudinal section view of a second combined cycle engine having a plurality of ramjet engines that incorporate a swirl generator constructed in accordance with the teachings of the present invention.
Figure 35:
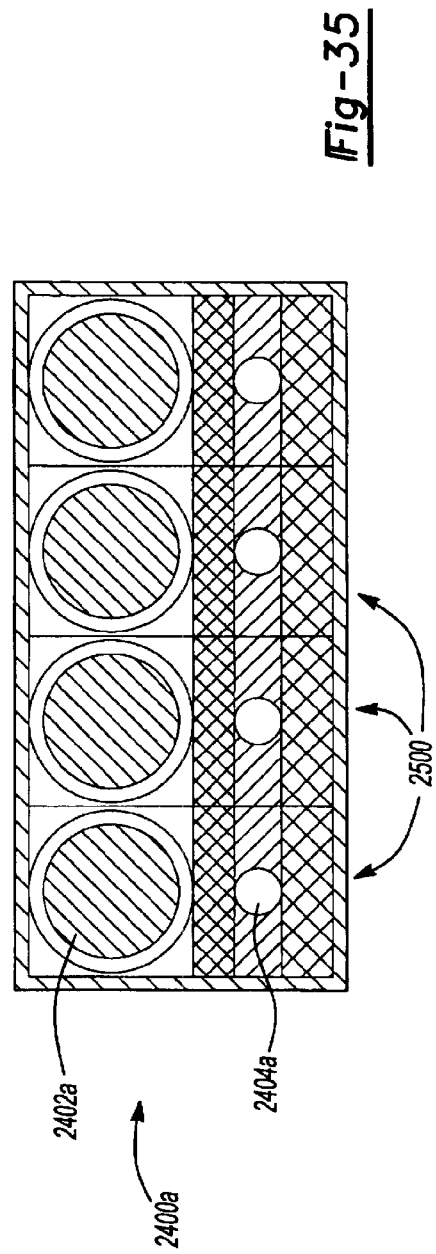
FIG. 35 is a section view taken along the line 35—35 of FIG. 34.

Another swirl augmented combined cycle engine 2400a is illustrated in FIGS. 34 and 35. The swirl augmented combined cycle engine 2400a is similar to the swirl augmented combined cycle engine 2400 of FIGS. 32 and 33 in that it employs a turbojet engines 2402a, a ramjet engines 2404a and a flow controller 2406a, which selectively controls the input of air to the turbojet engine 2402a and the ramjet engine 2404a. The swirl augmented combined cycle engine 2400a, however, is segregated into a plurality of engine cells 2500, with each engine cell 2500 including a turbojet engine 2402a, a ramjet engine 2404a and a flow controller 2406a. Operation of each engine cell 2500 is identical to the operation of the swirl augmented combined cycle engine 2400 of FIGS. 32 and 33 and as such, need not be described in detail. The plurality of engine cells 2500 are operated in a manner such that propulsion is regulated between the turbojet engines 2402a and the ramjet engines 2404a in a uniform manner across the engine cells 2500 (i.e., transition from turbojet propulsion to ramjet propulsion is substantially simultaneous across all of the engine cells 2500).

FIGS. 36 and 37 illustrate yet another application of the swirl generator of the present invention. In this embodiment, a rocket-based combined cycle engine 4000 is illustrated to include a housing 4002, one or more rocket engines 4004, a ramjet engine 4006 and a nozzle 4008. The housing 4002 houses the rocket engines 4004 and the ramjet engine 4006 and defines an air inlet 4020. The rocket engines 4004, which may be coupled to the housing 4002 such that they are located in the dump step 4022 (or quarl surface) and/or inside the aft end of the aft centerbody assembly 244p, may employ a liquid, slurry or solid fuel, depending upon the application and considerations for the altitude, range and speed that are mandated by the mission. The ramjet engine 4006 includes a swirl generator 30p which is generally similar to the swirl generator 30, except for the aforementioned rocket engine 4004 that is mounted to aft centerbody assembly 244p.

The rocket engines 4004 provide low speed thrust and additionally serve to pump air into the air inlet 4020. Air flowing through the air inlet 4020 is converted into a highly turbulent flow field into which fuel is injected and mixed (via the swirl generator 30p) in the manner described in detail above. In this regard, the air flowing through the air inlet is employed in an afterburning operation by the ramjet engine 4006 to augment the thrust that is generated by the rocket engines 4004 at all speeds. The pumping action is a result of the momentum transfer from the high velocity rocket exhaust and the entrained ambient air. The momentum transfer is the result of the turbulent exchange through the shear layers separating the exhaust of each rocket engine 4004 and the entrained air. Alternatively, the rocket engines 4004 may be used to rapidly accelerate the rocket-based combined cycle engine 4000 above a predetermined speed threshold after which propulsion is transitioned to the ramjet engine 4006.

Those skilled in the art will appreciate that a forward flap or diverter (not shown) may be employed to close-off the air inlet 4020 during low speed operation of the rocket-based combined cycle engine 4000 to effect pure rocket thrust generation up to a predetermined speed threshold after which propulsion is transitioned to the ramjet engine 4006. This mode of operation produces higher ramjet combustor pressures and associated thrust without the occurrence of backflow through the air inlet 4020 at lower speeds.

For optimum thrust in any mode of operation, the nozzle 4008 preferably includes a variable area throat 4030. The variable area throat 4030 is selectably configured to match the flow rate and backpressure requirements of the rocket-based combined cycle engine 4000 for maximum and efficient thrust generation. Those skilled in the art will appreciate, however, that other nozzle throat concepts may be employed in the alternative, including consumable throat inserts and ejectable throat inserts.

Figure 38:
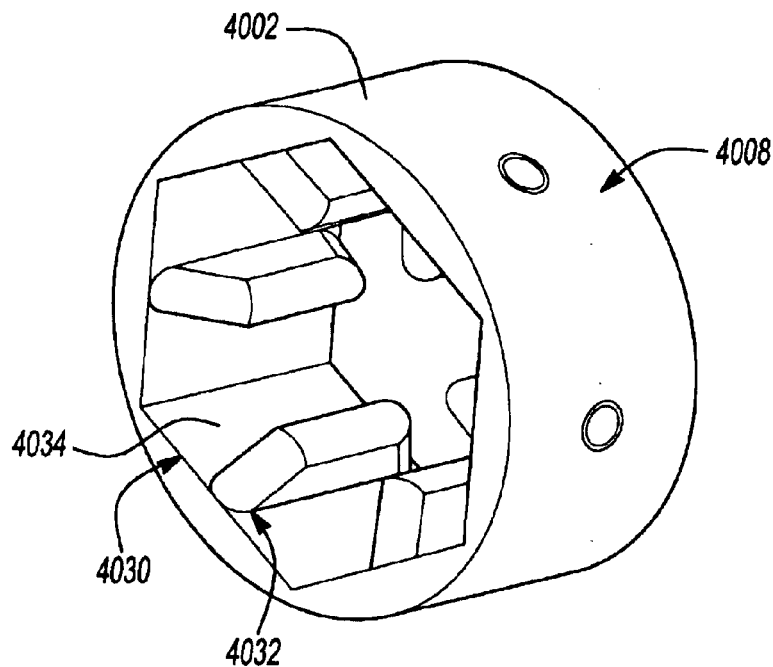
FIG. 38 is a perspective view of a portion of the rocket-based combined cycle engine illustrating the variable area throat in an open condition.
Figure 39:
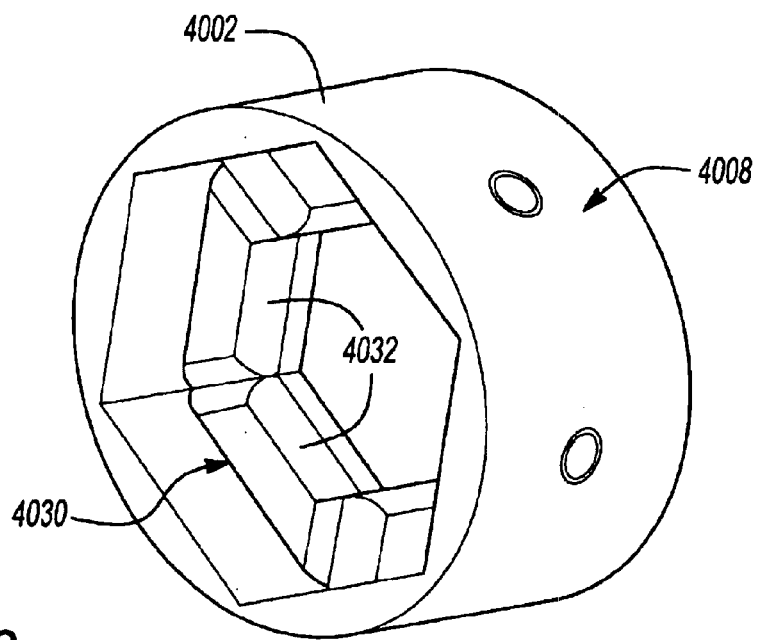
FIG. 39 is a perspective view similar to that of FIG. 38, but illustrating the variable area throat in a closed condition.

With additional reference to FIGS. 38 and 39, an exemplary variable area throat 4030 is illustrated to include a plurality of throat closure elements 4032 that are rotatable in the housing 4002 through an angle of about 90° between an open position, which is illustrated in FIGS. 37 and 38, and a closed position, which is illustrated in FIG. 39. Although only six elements are shown, those skilled in the art will appreciate that that the number of throat closure elements 4032 may be varied to coordinate with the particular upstream geometry of the a rocket-based combined cycle engine 4000. In the particular example illustrated, gaps 4034 are aligned to the six upstream rocket engines 4004 in the low speed mode to minimize erosion of the throat closure elements 4032 during the operation of the rocket engines 4004. When the throat closure elements 4032 are positioned in the closed position during the operation of the ramjet engine 4006, the area of the throat is substantially reduced.

In the embodiment illustrated, the throat closure elements 4032 rotate about an axis on a plane or facet on the inner surface of the housing 4002. The operational mechanism for rotating the throat closure elements 4032 may be housed in the housing 4002 or mounted on an adjacent structure (e.g., fins) to which the rocket-based combined cycle engine 4000 is mounted. Preferably, the throat closure elements 4032 are operated in opposed pairs so as to minimize rotational torques on the rocket-based combined cycle engine 4000 when the throat closure elements 4032 are moved between the open and closed positions.

When the throat closure elements 4032 are positioned in the closed position, the throat closure elements 4032 cooperate to provide the throat with an approximately circular shape; the extent to which the throat is circular is dependent upon the number of throat closure elements 4032 that are employed and whether or not the edges of the throat closure elements 4032 are contoured.

During the operation of the rocket-based combined cycle engine 4000, compressed air enters the air inlet 4020 and is directed to the swirl generator 30p. The air inlet 4020 also functions as an isolator at supersonic flight speeds where the air is further compressed and brought to subsonic speeds prior to being directed into the swirl generator 30p. The length of the air inlet 4020 is dictated by packaging requirements including fuel, propellants, warhead type (for missile applications), plumbing, controller(s), actuators and batteries. The minimum length of the air inlet 4020 is dictated by the isolation requirements that are necessitated during supersonic flight speeds.

During the combined operation of the rocket engines 4004 and the ramjet engine 4006, the swirl generator 30p functions to augment core flow mixing where flame stabilization is achieved in the recirculation zones in the backward facing areas between the exhaust nozzles 4004a of the rocket engines 4004 that are mounted in the outer step and/or an annular lip region at the end of the aft bluff boat-tail 304p. Special igniters are not required since the hot rocket exhaust will serve to ignite the fuel/air mixture for afterburning and ramjet operation. In addition, fuel and/or rocket propellant may be continuously bled through the otherwise idle rocket engines to help cool them and to prevent back flow of the ramjet's hot combustion by-products. The total engine flow passes through the variable area throat 4030 and is expelled to the atmosphere. Although the primary application anticipated for this technology is missile propulsion, those skilled in the art will appreciate that the rocket-based combined cycle engine 4000 may also be employed for aircraft propulsion where reduced weight and complexity would be desired.

Another application is of the swirl generator of the present invention is shown in FIG. 41, which illustrates the retrofitting of a conventional afterburner 5000 of the military gas turbine engine 5002 that is shown in FIG. 40. Briefly, the military gas turbine engine 5002, which may be a turbojet engine or a turbofan engine, includes a coaxially-mounted afterburner 5000 having a diffuser tailcone 5004 with one or more fuel spray rings 5006, one or more concentric V-gutter flameholder rings 5008 and a variable area nozzle 5010. The variable area nozzle 5010 is fully opened for afterburning operation and is reduced for non-afterburning operation.

Returning to FIG. 41, retrofit of the military gas turbine engine 5002 entails the substitution of afterburner 5020 for the conventional afterburner 5000 (FIG. 40). The afterburner 5020 includes swirl generator 30r having a variable-angle swirl vane pack 206r, a centerbody assembly 236r, which has a collapsible centerbody cone 5022, an expanding burner 5024, which has a quarl step 5026, an array of fuel injectors 5028 that are embedded into the base of the vanes 402r for main afterburning, an array of circumferentially spaced apart fuel injectors 5030 (illustrated as injection orifices in the particular example illustrated) located on the aft centerbody assembly 244r for ignition and piloting the afterburning, and one or more igniters (not shown) that are located in the aft end or base of the aft centerbody assembly 244r and/or in the recess of the quarl step 5026.

In order to maximize the benefits of the swirl augmentation provided by the swirl generator 30r, attachment of the swirl generator 30r should be as close as possible to the turbine exit plane. Accordingly, the length of the conical diffuser (i.e., the collapsible centerbody cone 5022) can be shortened relative to the embodiment of FIG. 40.

The hot gases, which consist mostly of air exiting the turbine and relatively cold air from the bypass fan of the main engine, enter the swirl generator 30r where they are swirled and the streams are mixed to form a highly turbulent, three-dimensional flowfield. The fuel that is injected into this high shear stress-laden swirling flow is rapidly atomized and mixed. Atomization and mixing are controlled by a novel design of the swirl generator 30r.

The swirling mixture of the afterburner fuel, hot turbine gases and colder bypass fan air are slowed down across the quarl step 5026 as the flow enters the combustor 5024, and creates a central recirculation zone and an outer recirculation zone similar to the central recirculation zone 610 and outer recirculation zone 640 of FIG. 13. The central recirculation zone is governed by the combined effects of the swirl strength (a characteristic of the variable-angle swirl vane pack 206r) and the blunt aft end of the aft centerbody assembly 244r. The outer recirculation zone is created by separation of the fuel/air mixture as it flows over the quarl step 5026. Combustion in the afterburner 5020 is very robust, stable and highly efficient such that the energetic, high temperature by-products of the combustion event are expanded through the variable area nozzle 5010 to provide high levels of thrust.

During non-afterburning operation, the swirl generator 30r serves as a channel between the main engine and the variable area nozzle 5010. To avoid significant pressure losses due to the presence of the vanes 402r, the variable-angle swirl vane pack 206r is controlled such that the angle of the vanes 402r is changed to 0° so as to remove the swirl from the flow and thereby maintain the axial character of exhaust flow. Vanes 402r having a flat profile are presently preferred. As an alternative to the variable angle swirl vane pack 206r, a two-position swirl vane pack (not shown) may also be employed. Also during non-afterburning operation, the collapsible centerbody cone 5022 that is attached to the aft centerbody 244r is extended to create a flowfield with relatively greater aerodynamic efficiency and relatively lower pressure losses.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments failing within the foregoing description and the appended claims.

What is claimed is:

1. A fuel/oxidizer mixing and combusting apparatus comprising:
   a combustor having a combustor inlet; and
   a swirl generator having:
      an inlet housing coupled to the combustor inlet, the inlet housing defining a hollow interior volume therein and serving as a conduit through which an oxidizer flow is conducted, the oxidizer flow having a velocity that is substantially defined by an axial velocity component, the hollow interior volume intersecting the combustor inlet at a dump step wherein the inlet housing has an inner dimension that is smaller than that of the combustor inlet;
      a swirl vane pack disposed within the hollow interior volume and having a plurality of vanes, the vanes cooperating to change the velocity of the oxidizer flow so that the velocity includes a substantial tangential velocity component;
      a centerbody assembly disposed in the hollow interior volume, the centerbody assembly being coupled to the swirl vane pack and extending rearwardly therefrom; the center body assembly including an aft bluff body, an aft-most portion of the aft bluff body being sized relatively larger than an adjacent upstream portion of the centerbody assembly; and
      a plurality of groups of fuel injectors coupled to at least one of the inlet housing, the swirl vane pack and the centerbody assembly and dispensing a fuel therefrom directly into the oxidizer flow for at least partially mixing the fuel and oxidizer prior to entering the combustor;
   wherein the swirl generator converts the oxidizer flow received therein into a swirling, three-dimensional flowfield;
   wherein a first portion of the flowfield flows over the dump step to form an outer recirculation zone;
   wherein a second portion of the flowfield forms a central recirculation zone that is anchored by an aft end of the centerbody assembly;
   wherein a first portion of the fuel mixes with the first portion of the flowfield to fuel the outer recirculation zone;

wherein a second portion of the fuel mixes with the second portion of the flowfield to fuel the central recirculation zone;

and wherein a remaining portion of the fuel enters and fuels a core flow.

2. The fuel/oxidizer mixing and combustion apparatus of claim 1, wherein the fuel injectors are positioned to inject the fuel downstream of the swirl vane pack.

3. The fuel/oxidizer mixing and combustion apparatus of claim 1, wherein the fuel injectors include a plurality of circumferentially spaced apart wall injectors that are coupled to the inlet housing and inject fuel therethrough.

4. The fuel/oxidizer mixing and combustion apparatus of claim 1, wherein at least one of the fuel injectors is housed in the centerbody assembly.

5. The fuel/oxidizer mixing and combustion apparatus of claim 4, wherein the centerbody assembly includes at least one injection ring, the injection ring including a plurality of fuel injection sites that are spaced apart about a perimeter of the injection ring.

6. The fuel/oxidizer mixing and combustion apparatus of claim 4, wherein the at least one of the fuel injectors is coupled to an aft end of the centerbody assembly and is configured to inject fuel in a direction downstream of the centerbody assembly.

7. The fuel/oxidizer mixing and combustion apparatus of claim 1, wherein the plurality of fuel injectors include a plurality of fuel injection sites that are formed into at least a portion of the vanes of the swirl vane pack.

8. The fuel/oxidizer mixing and combustion apparatus of claim 7, wherein each vane includes a trailing edge and a lateral surface and wherein the fuel injection sites on a given vane are formed into at least one of the trailing edge and the lateral surface.

9. The fuel/oxidizer mixing and combustion apparatus of claim 1, wherein the plurality of injectors include a plurality of strut injectors coupled to the inlet housing and the centerbody assembly, each of the strut injectors including a plurality of fuel injection sites.

10. The fuel/oxidizer mixing and combustion apparatus of claim 1, wherein the aft bluff body has a boat tail shape that is configured to augment flow separation of the oxidizer flow.

11. The fuel/oxidizer mixing and combustion apparatus of claim 1, wherein a plurality of injection sites are formed about a perimeter of the aft bluff body.

12. The fuel/oxidizer mixing and combustion apparatus of claim 1, wherein the aft bluff body has a shape that is selected from a group consisting of a frusto-conical shape and an ogive shape.

13. The fuel/oxidizer mixing and combustion apparatus of claim 12, wherein a plurality of channels are formed into a perimeter of the aft bluff body.

14. The fuel/oxidizer mixing and combustion apparatus of claim 1, wherein the swirl generator further comprises at least one igniter, the igniter being coupled to one of the centerbody assembly, the inlet housing and the combustor, the igniter being operable for generating an ignition kernel that ignites the fuel/oxidizer mixture in the central recirculation zone.

15. The fuel/oxidizer mixing and combustion apparatus of claim 14, wherein the igniter is housed in the centerbody assembly.

16. The fuel/oxidizer mixing and combustion apparatus of claim 15, further comprising a second igniter coupled to the combustor at a location downstream of the dump step.

17. The fuel/oxidizer mixing and combustion apparatus of claim 14, wherein the igniter is selected from a group of igniters consisting of spark igniters, plasma jet igniters, laser-based igniters and microwave based igniters.

18. The fuel/oxidizer mixing and combustion apparatus of claim 1, wherein the combustor has a length-to-diameter ratio that is less than about 2.0.

19. The fuel/oxidizer mixing and combustion apparatus of claim 18, wherein the length-to-diameter ratio is less than about 1.6.

20. The fuel/oxidizer mixing and combustion apparatus of claim 19, wherein the length-to-diameter ratio is about 1.0.

21. The fuel/oxidizer mixing and combustion apparatus of claim 1, wherein the vanes include a trailing edge, at least a portion of the trailing edge being configured with a plurality of discontinuities.

22. The fuel/oxidizer mixing and combustion apparatus of claim 21, wherein the discontinuities are selected from a group consisting of scallops, ramps and grooves.

23. The fuel/oxidizer mixing and combustion apparatus of claim 21, wherein a plurality of fuel injection sites are formed into each vane proximate the discontinuities, the plurality of fuel injection sites comprising at least a portion of the fuel injectors.

24. The fuel/oxidizer mixing and combustion apparatus of claim 1, wherein an inlet ramp is formed onto the inlet housing adjacent the dump step.

25. The fuel/oxidizer mixing and combustion apparatus of claim 24, wherein a plurality of circumferentially spaced apart channels are formed into the inlet ramp, the channels enhancing turbulent transport and fine scale mixing.

26. The fuel/oxidizer mixing and combustion apparatus of claim 24, wherein a plurality of circumferentially spaced apart injection sites are formed into the inlet ramp, the injection sites comprising at least a portion of the fuel injectors.

27. The fuel/oxidizer mixing and combustion apparatus of claim 1, wherein the inlet of the combustor includes a quarl expansion.

28. The fuel/oxidizer mixing and combustion apparatus of claim 1, wherein the vanes are configured to provide the swirl vane pack with a swirl number that is less than about 2.0.

29. The fuel/oxidizer mixing and combustion apparatus of claim 28, wherein the swirl number of the swirl vane pack is about 0.4 to about 1.2.

30. An apparatus comprising:

a combustor having an inlet;

a swirl generator that is coupled to the inlet of the combustor, the swirl generator being operable for converting an oxidizer flow with a velocity that is substantially completely defined by an axial velocity component into a three-dimensional flowfield that includes a substantial tangential velocity component, the swirl generator including a flow defining means and a fueling means, the flow defining means including swirl vanes and a centerbody with an aft bluff body, at least an aft-most portion of the aft bluff body being sized relatively larger than an adjacent upstream portion of the centerbody, the flow defining means being operable for effecting both an outer recirculation zone and a central recirculation zone in the combustor, the outer recirculation zone being toroidal in shape, the central recirculation zone being disposed inwardly of the outer recirculation zone, the fueling means being operable for fueling the outer and central recirculation zones and including a plurality of groups of fuel injectors for injecting the fuel directly into the oxidizer flow for at least partially mixing the fuel and oxidizer prior to entering the combustor;

wherein heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones.

31. The apparatus of claim 30, further comprising a nozzle coupled to an aft end of the combustor, the nozzle being selected from a group consisting of convergent and convergent/divergent nozzles.

32. The apparatus of claim 30, further comprising an inlet structure coupled to the swirl generator opposite the combustor, the inlet structure including a plurality of flow guide vanes for mitigating oxidizer flow distortions and flow separations in the oxidizer flow before the oxidizer flow enters the swirl generator.

33. The apparatus of claim 32, wherein the inlet structure guides the oxidizer flow around a bend.

34. The apparatus of claim 30, wherein the flow defining means includes a swirl vane pack having a plurality of vanes and wherein the vanes are configured to provide the swirl vane pack with a swirl number that is less than about 2.0.

35. The apparatus of claim 34, wherein the swirl number of the swirl vane pack is about 0.4 to about 1.2.

36. The apparatus of claim 30, wherein the combustor has a length-to-diameter ratio that is less than about 2.0.

37. The apparatus of claim 36, wherein the length-to-diameter ratio is less than about 1.6.

38. The apparatus of claim 37, wherein the length-to-diameter ratio is about 1.0.

39. An apparatus comprising:
a combustor having an inlet;
a swirl generator that is coupled to the inlet of the combustor, the swirl generator being operable for converting an oxidizer flow with a velocity that is substantially completely defined by an axial velocity component into a three-dimensional flowfield that includes a substantial tangential velocity component, the swirl generator including a flow defining means and a fueling means, the flow defining means being operable for effecting both an outer recirculation zone and a central recirculation zone in the combustor, the outer recirculation zone being toroidal in shape, the central recirculation zone being disposed inwardly of the outer recirculation zone, the fueling means being operable for fueling the outer and central recirculation zones; and
an inlet structure coupled to the swirl generator apposite the combustor, the inlet structure including a plurality of flow guide vanes for mitigating oxidizer flow distortions and flow separations in the oxidizer flow before the oxidizer flow enters the swirl generator wherein heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones;
wherein the inlet structure guides the oxidizer flow around a bend; and
wherein the flow guide vanes are spaced apart so as to define a plurality of flow channels, each of the flow channels having a differently sized cross-section such that the flow channels produce a series of inlet flows that are substantially uniform in flow velocity.

40. An apparatus comprising:
a combustor having an inlet;
a swirl generator that is coupled to the inlet of the combustor, the swirl generator being operable for converting an oxidizer flow with a velocity that is substantially completely defined by an axial velocity component into a three-dimensional flowfield that includes a substantial tangential velocity component, the swirl generator including a flow defining means and a fueling means, the flow defining means being operable for effecting both an outer recirculation zone and a central recirculation zone in the combustor, the outer recirculation zone being toroidal in shape, the central recirculation zone being disposed inwardly of the outer recirculation zone, the fueling means being operable for fueling the outer and central recirculation zones; and
an inlet structure coupled to the swill generator opposite the combustor, the inlet structure including a plurality of flow guide vanes for mitigating oxidizer flow distortions and flow separations in the oxidizer flow before the oxidizer flow enters the swirl generator;
wherein heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones;
wherein the swirl generator includes a conduit through which is disposed at least one of a fuel conduit and an electrical cable, the conduit extending through at least one of the flow guide vanes, the inlet structure further comprising a fairing member that at least partially surrounds the conduit, the fairing member being operable for reducing flow separations that would otherwise be induced by the conduit.

41. An apparatus for providing propulsive power comprising:
an inlet structure for conducting an oxidizer flow therethrough, the inlet structure including a plurality of flow guiding vanes that cooperate to affect the oxidizer flow such that it is substantially uniform and axial;
a swirl generator coupled to an aft end of the inlet structure, the swirl generator including a flow affecting means and a fueling means, the flow affecting means including a plurality of vanes, a centerbody having an aft end that terminates rearwardly of a root of the vanes and a dump step, the flow affecting means being operable for converting the uniform and axial oxidizer flow into a three dimensional flowfield that includes a substantial tangential velocity component, the flow affecting means being further operable for effecting both a toroidal outer recirculation zone, which is anchored by the dump step, and a central recirculation zone that is disposed inwardly of the outer recirculation zone and anchored by the aft end of the centerbody, the fueling means being operable for fueling the outer and central recirculation zones and a core flow; and
a combustor coupled to an aft end of the swirl generator, the combustor including a nozzle;
wherein heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones; and wherein combustion by-products from the core flow are expelled through the nozzle to produce thrust.

42. The apparatus for providing propulsive power of claim 41, wherein the fueling means injects a fuel down stream of an aft end of the vanes of the flow affecting means.

43. The apparatus for providing propulsive power of claim 42, wherein the fueling means includes a plurality of circumferentially spaced apart wall injections that are coupled to the inlet structure and which inject the fuel through the inlet structure.

44. The apparatus for providing propulsive power of claim 42, wherein the fueling means includes at least one fuel injector that is housed in the centerbody.

45. The apparatus for providing propulsive power of claim 44, wherein the centerbody includes at least one injection ring, the injection ring including a plurality of fuel injection sites that are spaced apart about a perimeter of the injection ring.

46. The apparatus for providing propulsive power of claim 44, wherein at least one of the fuel injectors is coupled to an aft end of the centerbody and is configured to inject the fuel in a direction downstream of the centerbody.

47. The apparatus for providing propulsive power of claim 41, wherein the fueling means includes a plurality of fuel injection sites that are formed into at least a portion of the vanes of the flow affecting means.

48. The apparatus for providing propulsive power of claim 47, wherein each of the vanes of the flow affecting means includes a trailing edge and a lateral surface and wherein the fuel injection sites on a given vane are formed into at least one of the trailing edge and the lateral surface.

49. The apparatus for providing propulsive power of claim 41, wherein the centerbody terminates at an aft bluff boat tail-body, the aft bluff boat-tail body being configured to augment flow separation of the oxidizer flow.

50. The apparatus for providing propulsive power of claim 49, wherein the fueling means includes a plurality of injection sites that are formed about a perimeter of the aft bluff boat-tail body.

51. The apparatus for producing propulsive power of claim 49, wherein the aft bluff boat-tail body has a shape that is selected from a group consisting of a frusto-conical shape and an ogive shape.

52. The apparatus for providing propulsive power of claim 51, wherein a plurality of channels are formed into a perimeter of the aft bluff boat-tail body.

53. The apparatus for providing propulsive power of claim 41, further comprising at least one igniter that is coupled to one of the centerbody, the inlet structure and combustor.

54. The apparatus for providing propulsive power of claim 53, wherein a first igniter is housed in the centerbody and a second igniter is coupled to the combustor downstream of the dump step.

55. The apparatus for providing propulsive power of claim 53, wherein the igniter is selected from a group of igniters consisting of spark igniters, plasma jet igniters, laser-based igniter end microwave based igniters.

56. The apparatus for providing propulsive power of claim 41, wherein the combustor has a length-to-diameter ratio that is less than about 2.0.

57. The apparatus for providing propulsive power of claim 56, wherein the length-to-diameter ratio is less than about 1.6.

58. The apparatus for providing propulsive power of claim 57, wherein the length-to-diameter ratio is about 1.0.

59. The apparatus for providing propulsive power of claim 41, wherein a plurality of discontinuities are formed into a trailing edge of at least a portion of the vanes of the flow affecting means.

60. The apparatus for providing propulsive power at claim 59, wherein the discontinuities are selected from a group consisting of scallops, ramps and grooves.

61. The apparatus for providing propulsive power of claim 59, wherein the fueling means includes a plurality of injection sites that are formed into the vanes of the flow affecting means, each of the injection sites being proximate an associated one of the discontinuities.

62. The apparatus for providing propulsive power of claim 41, wherein the flow affecting means includes an inlet ramp that is coupled to the inlet structure adjacent the dump step.

63. The apparatus for providing propulsive power of claim 62, wherein a plurality of circumferentially spaced apart channels are formed into the inlet ramp.

64. The apparatus for providing propulsive power of claim 63, wherein the fueling means includes a plurality of circumferentially spaced apart injection sites that are formed into the inlet ramp.

65. The apparatus for providing propulsive power of claim 41, wherein the combustor includes a quarl expansion.

66. The apparatus for providing propulsive power of claim 41, wherein the vanes of the flow affecting means provide a swirl number that is less than about 2.0.

67. The apparatus for providing propulsive power of claim 66, wherein the swirl number is about 0.4 to about 1.2.

68. An apparatus for providing propulsive power comprising:
a combustor having a combustor inlet, the combustor including a nozzle; and
a swirl generator having:
an inlet housing coupled to the combustor inlet, the inlet housing defining a hollow interior volume therein and serving as a conduit through which an oxidizer flow is conducted, the oxidizer flow having a velocity that is substantially defined by an axial velocity component, the hollow interior volume interjecting the combustor inlet at a dump step wherein the inlet housing has an inner dimension that is smaller than that of the combustor inlet;
a swirl vane pack disposed within the hollow interior volume and having a plurality of vanes, the vanes cooperating to change the velocity of the oxidizer flow so that the velocity includes a substantial tangential velocity component;
a centerbody assembly disposed in the hollow interior volume, the centerbody assembly being coupled to the swirl vane pack and extending rearwardly therefrom, the centerbody assembly including an aft bluff body, an aft-most portion of the aft bluff body being sized relatively larger than an adjacent upstream portion of the centerbody assembly; and
a plurality of groups of fuel injectors coupled to at least one of the inlet housing, the swirl vane pack and the centerbody assembly and
dispensing a fuel therefrom directly into the oxidizer flow for at least partially mixing the fuel and oxidizer prior to entering the combustor;
wherein the swirl generator converts the oxidizer flow received therein into a swirling, three-dimensional flowfield, wherein a first portion of the flowfield flows over the dump step to form an outer recirculation zone, wherein a second portion of the flowfield forms a central recirculation zone that is anchored by an aft end of the centerbody assembly, wherein a first portion of the fuel mixes with the first portion of the flowfield to fuel the outer recirculation zone, wherein a second portion of the fuel mixes with the second portion of the flowfield to fuel the central recirculation zone, and wherein a remaining portion of the fuel enters and fuels a core flow; and wherein combustion by-products from the core flow are expelled through the nozzle to produce thrust.

69. The apparatus for providing propulsive power of claim 68, wherein the fuel injectors are positioned to inject the fuel downstream of the swirl vane pack.

70. The apparatus for providing propulsive power of claim 68, wherein the fuel injectors include a plurality of circumferentially spaced apart wall injectors that are coupled to the inlet housing and inject fuel therethrough.

71. The apparatus for providing propulsive power of claim 68, wherein at least one of the fuel injectors is housed in the centerbody assembly.

72. The apparatus for providing propulsive power of claim 71, wherein the centerbody assembly includes at least one injection ring, the injection ring including a plurality of fuel injection sites that are spaced apart about a perimeter of the injection ring.

73. The apparatus for providing propulsive power of claim 68, wherein the aft bluff body has a boat tail shape that is configured to augment flow separation of the oxidizer flow.

74. The apparatus for providing propulsive power of claim 68, wherein a plurality of injection sites are formed about a perimeter of the aft bluff body.

75. The apparatus for providing propulsive power of claim 68, wherein the aft bluff body has a shape that is selected from a group consisting at a frusto-conical shape and an ogive shape.

76. The apparatus for providing propulsive power of claim 75, wherein a plurality of channels are formed into a perimeter of the aft bluff body.

77. The apparatus for providing propulsive power of claim 68, wherein the swirl generator further comprises at least one igniter, the igniter being coupled to one of the centerbody assembly, the inlet housing and the combustor, the igniter being operable for generating an ignition kernel that ignites the fuel/oxidizer mixture in the central recirculation zone.

78. The apparatus for providing propulsive power of claim 77, wherein the igniter is housed in the centerbody assembly.

79. The apparatus for providing propulsive power of claim 78, further comprising a second igniter coupled to the combustor at a location downstream of the dump step.

80. The apparatus for providing propulsive power of claim 77, wherein the igniter is selected from a group of igniters consisting of spark igniters, plasma jet igniters, laser-based igniters and microwave based igniters.

81. The apparatus for providing propulsive power of claim 68, wherein the combustor has a length-to-diameter ratio that is less than about 2.0.

82. The apparatus for providing propulsive power of claim 81, wherein the length-to-diameter ratio is less than about 1.6.

83. The apparatus for providing propulsive power of claim 82, wherein the length-to-diameter ratio is about 1.0.

84. The apparatus for providing propulsive power of claim 68, wherein an inlet ramp is formed onto the inlet housing adjacent the dump step.

85. The apparatus for providing propulsive power of claim 68, wherein the vanes are configured to provide the swirl vane pack with a swirl number that is less than about 2.0.

86. The apparatus for providing propulsive power of claim 85, wherein the swirl number of the swirl vane pack is about 0.4 to about 1.2.

87. An apparatus for providing propulsive power comprising:

a combustor having an inlet and a nozzle;

a swirl generator that is coupled to the inlet of the combustor, the swirl generator being operable for converting an oxidizer flow with a velocity that is substantially completely defined by an axial velocity component into a three-dimensional flowfield that includes a substantial tangential velocity component, the swirl generator including a flow defining means and a fueling means, the flow defining means including swirl vanes and a centerbody with an aft bluff body, at least an aft-most portion of the aft bluff body being sized relatively larger than an adjacent upstream portion of the centerbody, the flow defining means being operable for effecting both an outer recirculation zone and a central recirculation zone in the combustor, the outer recirculation zone being toroidal in shape, the central recirculation zone being disposed inwardly of the outer recirculation zone, the fueling means being operable for fueling the outer and central recirculation zones and including a plurality of groups of fuel injectors for injecting the fuel directly into the oxidizer flow for at least partially mixing the fuel and oxidizer prior to entering the combustor;

wherein heat and combustion by-products produced during combustion are carried upstream by the outer and central recirculation zones where the heat and combustion by-products are employed to continuously ignite a combustible fuel/oxidizer mixture in a shear layer adjacent each of the outer and central recirculation zones; and wherein combustion by-products are expelled through the nozzle to produce thrust.

88. The apparatus of claim 87, further comprising a nozzle coupled to an aft end of the combustor, the nozzle being selected from a group consisting of convergent and convergent/divergent nozzles.

89. The apparatus of claim 87, further comprising an inlet structure coupled to the swirl generator opposite the combustor, the inlet structure including a plurality of flow guide vanes for mitigating oxidizer flow distortions and flow separations in the oxidizer flow before the oxidizer flow enters the swirl generator.

90. The apparatus of claim 89, wherein the inlet structure guides the oxidizer flow around a bend.

91. The apparatus of claim 90, wherein the flow guide vanes are spaced apart so as to define a plurality of flow channels, each of the flow channels having a differently sized cross-section such that the flow channels produce a series of inlet flows that are substantially uniform in flow velocity.

92. The apparatus of claim 89, wherein the swirl generator includes a conduit through which is disposed at least one of a fuel conduit and an electrical cable, the conduit extending through at least one of the flow guide vanes, the inlet structure further comprising a fairing member that at least partially surrounds the conduit, the fairing member being operable for reducing flow separations that would otherwise be induced by the conduit.

93. The apparatus of claim 87, wherein the flow defining means includes a swirl vane pack having a plurality of vanes and wherein the vanes are configured to provide the swirl vane pack with a swirl number that is less than about 2.0.

94. The apparatus of claim 93, wherein the swirl number of the swirl vane pack is about 0.4 to about 1.2.

95. The apparatus of claim 87, wherein the combustor has a length-to-diameter ratio that is less than about 2.0.

96. The apparatus of claim 95, wherein the length-to-diameter ratio is less than about 1.6.

97. The apparatus of claim 96, wherein the length-to-diameter ratio is about 1.0.

* * * * *